United States Patent [19]
Ohtsuka

[11] Patent Number: 4,743,948
[45] Date of Patent: May 10, 1988

[54] RECORDING AND PROJECTING APPARATUS

[75] Inventor: Shuichi Ohtsuka, Kanagawa, Japan

[73] Assignee: Fuji Photo Film Co., Ltd., Kanagawa, Japan

[21] Appl. No.: 945,911

[22] Filed: Dec. 23, 1986

[30] Foreign Application Priority Data

Dec. 23, 1985 [JP] Japan .................. 60-289870

[51] Int. Cl.$^4$ .................................. G03B 27/32
[52] U.S. Cl. .................................. 355/27
[58] Field of Search .............. 355/27, 29, 41, 43, 355/45, 40; 354/298, 299; 219/216, 388

[56] References Cited

U.S. PATENT DOCUMENTS

| | | |
|---|---|---|
| 3,764,329 | 10/1973 | Lee . |
| 4,227,799 | 10/1980 | Nonaka et al. .......... 355/45 X |
| 4,561,769 | 12/1985 | Okano et al. ............ 355/45 |
| 4,671,648 | 6/1987 | Watanabe et al. ........ 355/40 |

FOREIGN PATENT DOCUMENTS

| | | |
|---|---|---|
| 48-80030 | 3/1973 | Japan . |
| 52-64925 | 5/1977 | Japan . |
| 52-73022 | 6/1977 | Japan . |
| 57-18171 | 4/1982 | Japan . |

Primary Examiner—K. T. Hix
Assistant Examiner—Brian W. Brown
Attorney, Agent, or Firm—Sughrue, Mion, Zinn, Macpeak, and Seas

[57] ABSTRACT

A recording and projecting apparatus employing a film using a photosensitive material which is sensitized by heating and developed after exposure by reheating. Marks to be detected are provided on the film at predetermined regular spacings, and these marks are detected by a sensor, whereby an image at a specific position on the film is accurately disposed at a predetermined processing position, thereby reducing positional errors.

18 Claims, 25 Drawing Sheets

RECORDING AND PROJECTING APPARATUS

BACKGROUND OF THE INVENTION

1. Field of the Invention

The present invention relates to a recording and projecting apparatus employing a film using a photosensitive material which is sensitized by heating and developed after exposure by reheating.

2. Description of the Related Art

The photosensitive material of the type described above is known from the specifications of Japanese patent Laid-Open Nos. 80030/1973, 64925/1977 and 73022/1977. Recording and projecting apparatuses which employ films coated with such photosensitive material have already been proposed in, for example, Japanese patent publication No. 18171/1982.

The above-described type of film has a plurality of frames, and after images have been recorded on such frames and processed so as to be reproducible, the film is unloaded rom the recording and projecting apparatus and stored in the light. The film characteristically enables recording to be additionally effected on a unrecorded or blank frame even after the film has been processed and stored as described above. Accordingly, employment of this type of film as a microfilm allows various advantageous uses which have heretofore been unavailable with conventional microfilms using silver halide as a photosensitive material.

Since, as described above, it is possible to effect recording on any desired frames on the film irrespective of the physical order, that is, the sequential order of the frames, it is necessary in order to make use of such advantage to provide means for disposing a specific frame at a predetermined position in the recording and projecting apparatus.

SUMMARY OF THE INVENTION

In view of the above-described circumstances, it is a primary object of the present invention to provide a recording and projecting apparatus which enables a specific frame to be disposed at a predetermined position in the apparatus.

To this end, the present invention provides a recording and projecting apparatus wherein marks which are to be detected are provided in advance on a film so as to correspond to respective frames on the film, and means for detecting these marks is disposed in the apparatus.

By virtue of the above-described arrangement, a particular frame can be identified by its ordinal number counted from a reference position by, for example, counting the number of detection marks which have passed the detecting means. Accordingly, it is possible to dispose a specific frame on a film at a predetermined position in the recording and projecting apparatus.

BRIEF DESCRIPTION OF THE DRAWINGS

FIGS. 1 to 24 show in combination one embodiment of the the recording and projecting apparatus according to the present invention, of which:

FIG. 1 is a perspective view showing the external appearance a recording and projecting apparatus consisting of a combination of a recording and projecting apparatus body and a copying machine;

FIG. 2 is a front view showing the external appearance of the recording and projecting apparatus, the copying machine being shown by the imaginary line;

FIG. 3 is a perspective view showing the external appearance of a cassette which is loaded into the apparatus in accordance with the embodiment of the present invention;

FIG. 4 is a perspective view showing the external appearance of the cassette illustrated in FIG. 3 as viewed from the reverse side thereof;

FIG. 5 is a perspective view of a tape and reels, which are accommodated in the cassette;

FIG. 6 is a detailed view of a part of a microfilm;

FIG. 7 is a sectional view of the microfilm taken along the line VII—VII in FIG. 6;

FIG. 8 is a schematic perspective view of a recording optical system in the recording and projecting apparatus;

FIG. 9 is a schematic perspective view of a projecting optical system in the recording and projecting apparatus;

FIG. 10 is a schematic perspective view of a copying optical system in the recording and projecting apparatus;

FIG. 11 is a sectional view taken along the line XI—XI in FIG. 2, which shows the inner structure of the recording and projecting apparatus body;

FIG. 12 is a plan view of the recording and projecting apparatus with a document pressing plate of a document table removed, which corresponds to a sectional view taken along the line XII—XII in FIG. 2;

FIG. 13 is a sectional view taken along the line XIII—XIII in FIG. 11, which shows the inner structure of the recording and projecting apparatus body;

FIG. 14 is a sectional view taken along the line XIV—XIV in FIG. 2, which shows the inner structure of the recording and projecting apparatus;

FIG. 15 is a sectional view taken along the lines XV—XV in FIGS. 14 and 21, which shows the inner structure of the recording and projecting apparatus;

FIG. 16 is a sectional view taken along the line XVI—XVI in FIG. 15, which shows the inner structure of the recording and projecting apparatus;

FIG. 17 is a front view of a processing head for carrying out each of the steps of processing a microfilm, which corresponds to a sectional view taken along the line XVII—XVII in FIG. 21;

FIG. 18 is a sectional view taken along the line XVIII—XVIII in FIG. 17;

FIG. 19 is a sectional view taken along the line XIX—XIX in FIG. 17;

FIG. 20 is a sectional view taken along the line XX—XX in FIG. 14, which shows the inner structure of the recording and projecting apparatus body;

FIG. 21 is a sectional view taken along the line XXI—XXI in FIG. 15, which shows the inner structure of the recording and projecting apparatus body;

FIG. 22 is a sectional view taken along the line XXII—XXII in FIG. 15, which shows the inner structure of the recording and projecting apparatus body;

FIG. 23 is a sectional view taken along the line XXIII—XXIII in FIG. 2, which schematically shows the inner structure of the copying machine;

FIG. 24 is a perspective view of an exposing table in the copying machine;

DESCRIPTION OF THE PREFERRED EMBODIMENTS

FIGS. 1 to 24 show in combination one embodiment of the recording and projecting apparatus according to the present invention.

Figure 1:
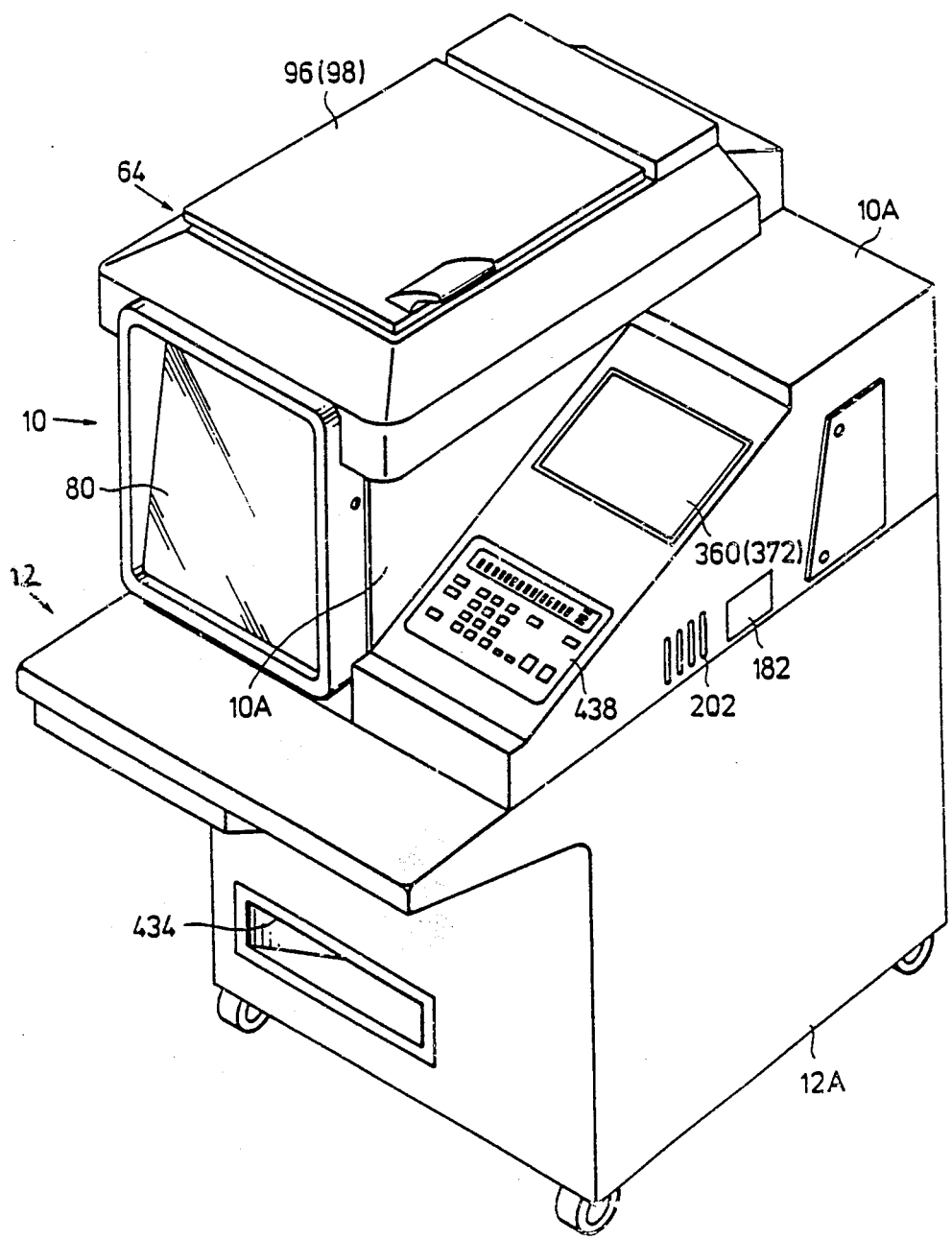
Figure 2:
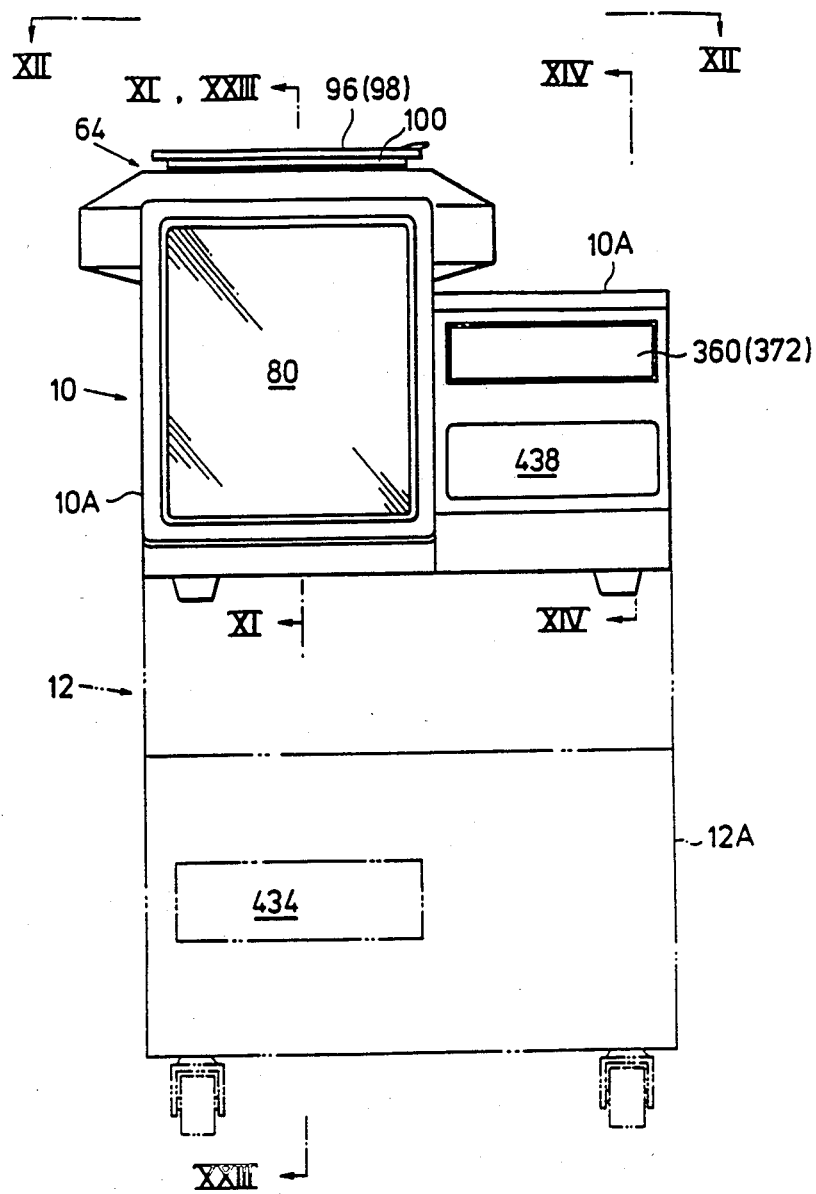

FIG. 1 is a perspective view showing the external appearance of the whole of the recording and projecting apparatus, and FIG. 2 is a front view of the system shown in FIG. 1. The recording and projecting apparatus shown in FIG. 1 has an integral structure which consists of a recording and projecting apparatus body 10 and a copying machine 12 having a housing 12A serving also as a table for mounting the body 10. It should be noted that the recording and projecting apparatus body 10 may be used alone as shown by the solid line in FIG. 2.

The embodiment of the present invention will be described hereinunder in detail.

[Cassette]

Figure 3:
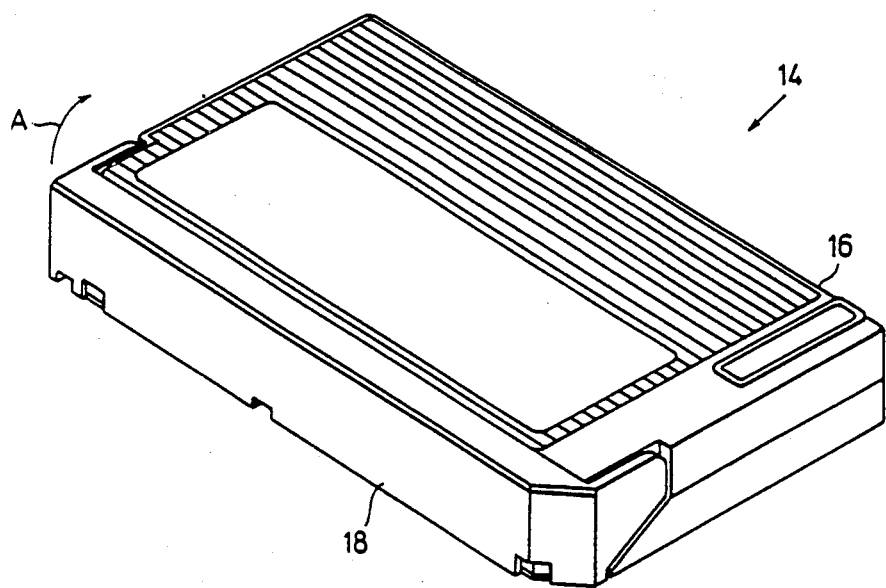
Figure 4:
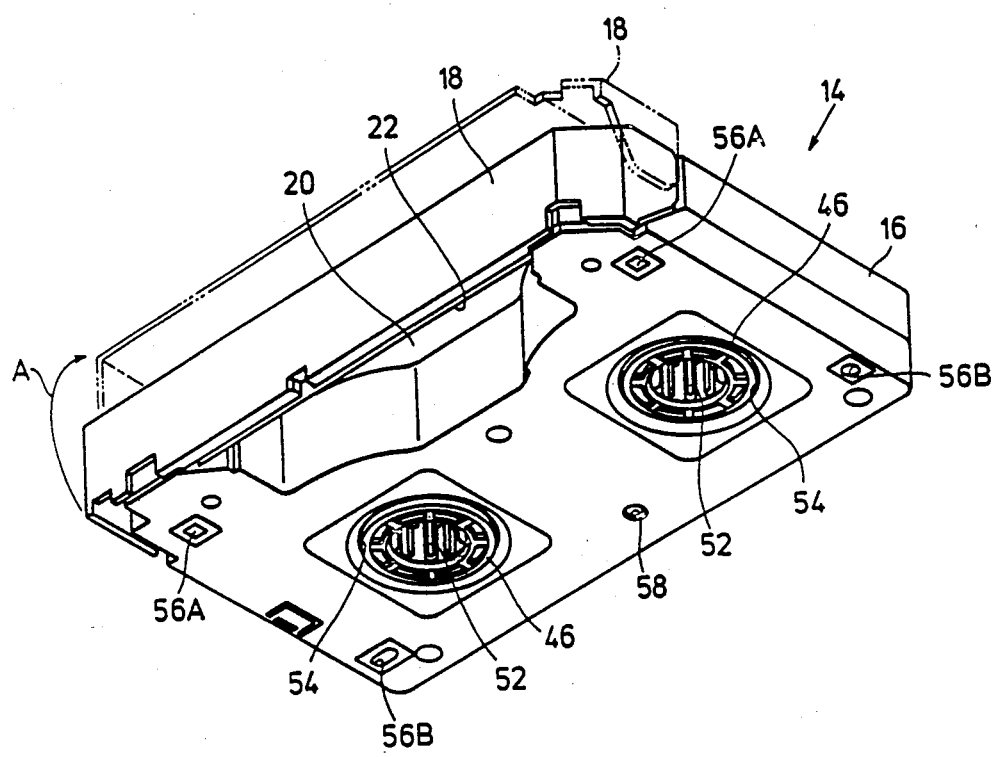

FIGS. 3 and 4 show a cassette which is loaded in the recording and projecting apparatus. FIG. 3 is a perspective view showing the external appearance of the cassette as viewed from the upper side thereof, and FIG. 4 is a perspective view of the cassette as viewed from the reverse side thereof.

A cassette 14 has a guard panel 18 disposed on the front side thereof. The guard panel 18 is pivotally supported at both lateral ends thereof by a cassette casing 16 so that the panel 18 is able to pivot in the direction of the arrow A. As shown in FIG. 4, the cassette casing 16 has a recess 20 which opens in both the front and reverse sides. The intermediate portion of a tape 22 which is accommodated inside the cassette casing 16 extends through the recess 20 in the lateral direction of the cassette casing 16. A portion of the tape 22 which is positioned in the recess 20 is exposed at the front side of the cassette casing 16 when the guard panel 18 is pivoted in the direction of the arrow A.

Figure 5:
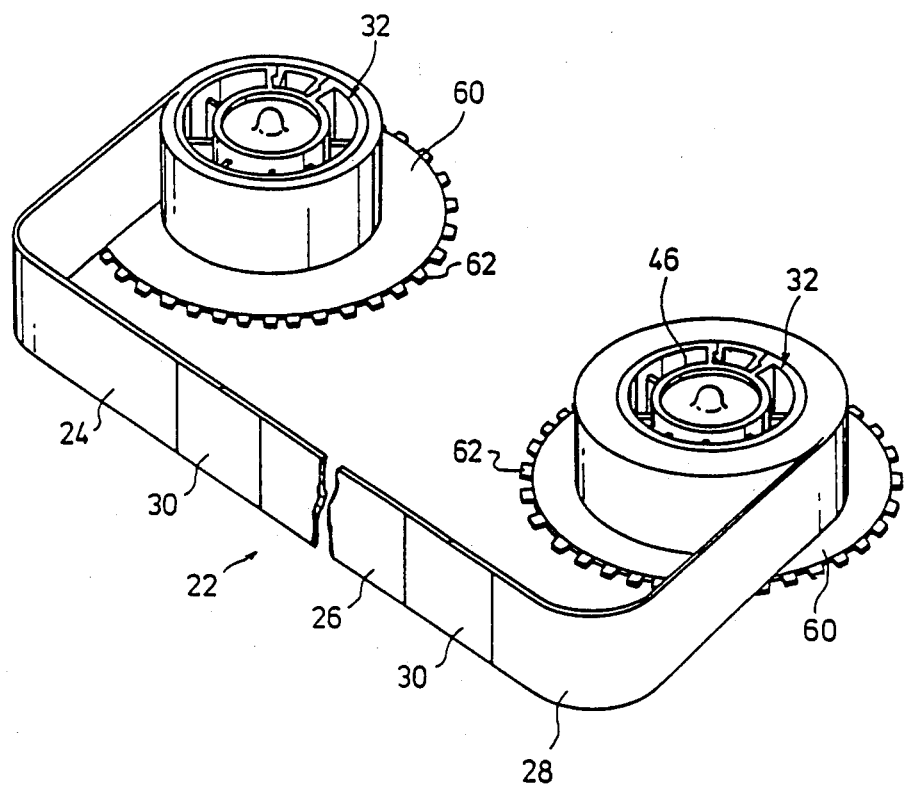

Referring to FIG. 5, the tape 22 consists of a leader tape 24, a magnetic tape 26 and a microfilm 28, which are spliced together along the longitudinal direction of the tape 22 by pieces of splicing tape 30. Both end portions of the tape 22 are respectively retained by a pair of reels 32 which are accommodated in the cassette casing 16 so that the tape 22 is wound on the reels 32.

Figure 6:
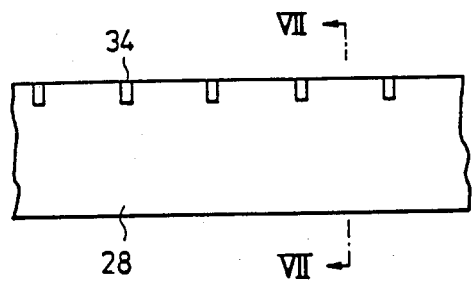
Figure 7:
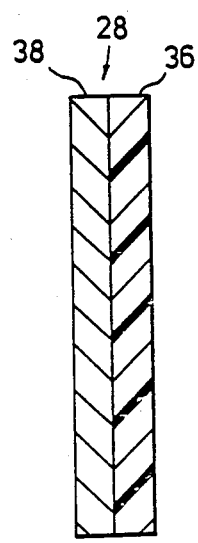

As shown in FIG. 6, the microfilm 28 is printed with blip marks 34 along the upper edge thereof at predetermined regular spacings in the longitudinal direction of the microfilm 28 (no blip marks 34 are shown in FIG. 5). As will be clear from FIG. 7 (a sectional view taken along the line VII—VII in FIG. 6), the microfilm 28 includes a transparent base 36, e.g., polyethylene, and a photosensitive layer 38 formed on the base 36, the photosensitive layer 38 being sensitized by heating and developed after exposure by reheating. The microfilm 28 is disposed in such a manner that, when the microfilm 28 is positioned in the recess 20 defined in the cassette casing 16, the side of the microfilm 28 which is closer to the photoconductive layer 43 faces the guard panel 18.

As shown in FIG. 4, each boss portion 46 has the shape of a tube the bottom of which is open, and projecting walls 52 are formed on the inner peripheral wall of the boss portion 46 at equal spacings. The boss portions 46 are respectively positioned in through-holes 54 provided in the bottom of the cassette casing 16 in such a manner that the boss portions 46 are exposed to the outside of the cassette casing 16.

The bottom of the cassette casing 16 is, as shown in FIG. 4, provided with a pair of positioning projections 56A which come in contact with positioning pins, respectively, a pair of positioning holes 56B each closed at one end thereof which receive positioning pins, respectively, and a through-hole 58 for receiving a brake releasing pin. When the pin is inserted into the through-hole 58, a brake mechanism is released which engages with rectangular projections 62 formed on the outer periphery of a flange portion 60 of each of the reels 32 (see FIG. 5) to prevent rotation of the reels 32.

[Optical Systems in Recording and Projecting Apparatus]

Figure 8:
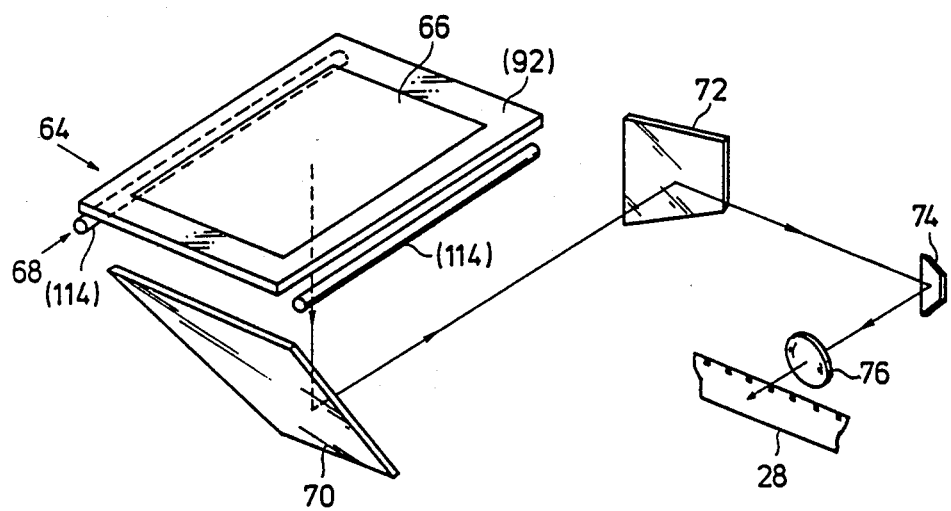
Figure 9:
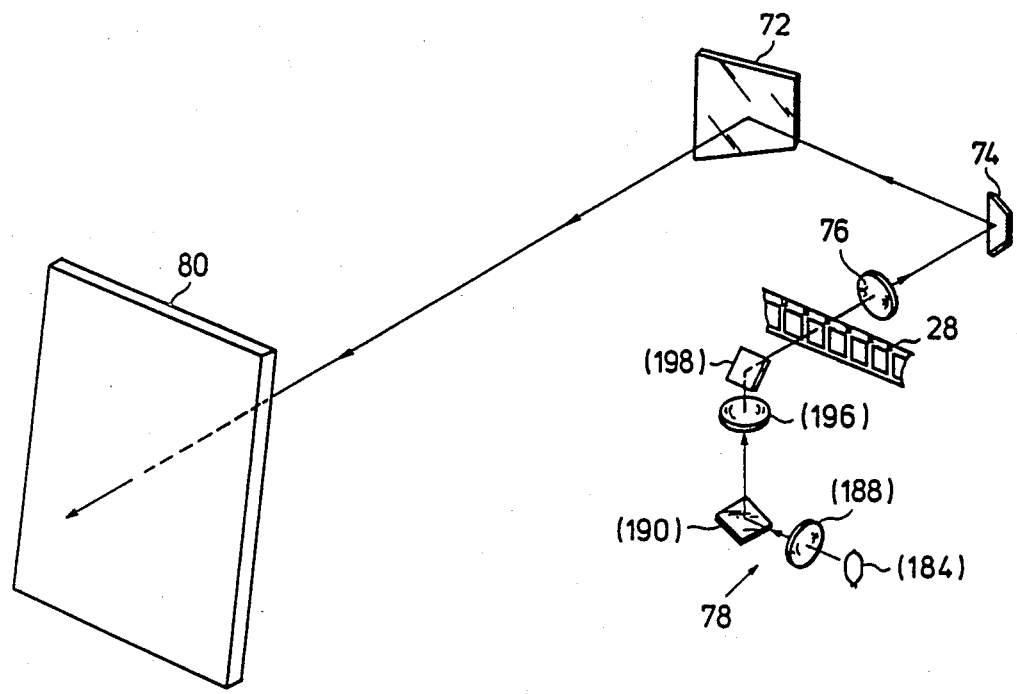
Figure 10:
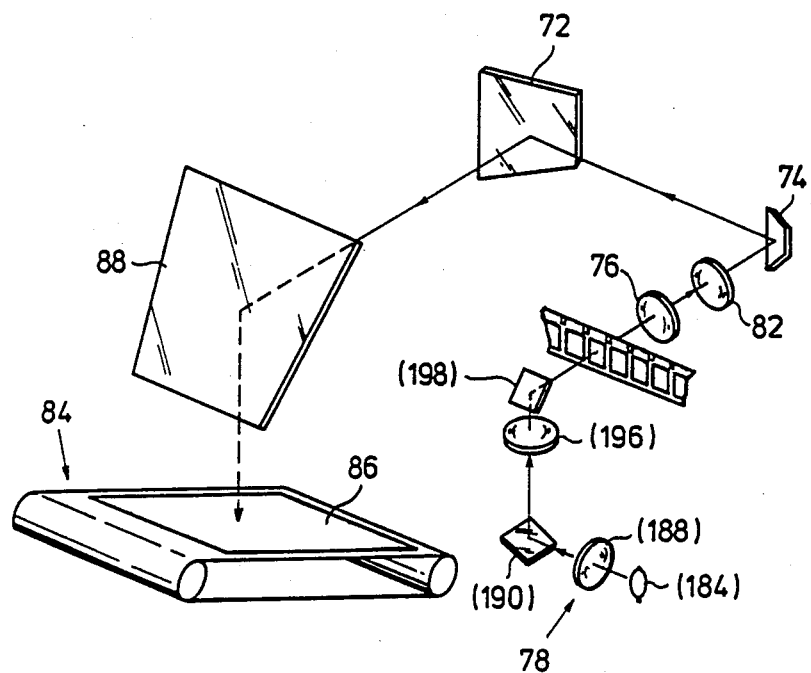

FIGS. 8 to 10 schematically show various optical systems in the recording and projecting apparatus, respectively.

Referring first to FIG. 8, a recording optical system includes a document illuminating means 68 which illuminates a document 66 as a subject which is set on a document table 64, a third mirror 70 on which the light reflected from the document 66 is made incident, a second mirror 72 on which the light reflected from the third mirror 70 is made incident, a first mirror 74 on which the light reflected from the second mirror 72 is made incident, and a main lens 76 for focusing the light reflected from the first mirror 74 on the surface of the microfilm 28.

Referring next to FIG. 9, a projecting optical system includes a projecting light source section 78 for illuminating the microfilm 28, the main lens 76 for focusing the light passing through the microfilm 28 on the first mirror 74, the second mirror 72 on which the light reflected from the first mirror 74 is made incident, and a screen 80 on which the light reflected from the second mirror 72 is projected.

As shown in FIG. 10, a copying optical system includes, the projecting light source section 78, the main lens 76, the first mirror 74, the second mirror 72, a conversion lens 82 disposed between the main lens 76 and the first mirror 74 to slightly reduce the optical image formed on the first mirror 74, and a copy mirror 88 adapted to reflect the light reflected from the second mirror 72 toward a sheet of copying paper 86 set on an exposing table 84 disposed in the copying machine 12 (see FIGS. 1 and 2).

The main lens 76 and the first and second mirrors 74, 72 are mutually used for the above-described three optical systems, and they are fixedly disposed within the housing 10A of the recording and projecting apparatus body 10 (see FIGS. 1 and 2). The third mirror 70, the copy mirror 88, the conversion lens 82 and the screen 80 are also disposed within the recording and projecting apparatus body 10 and selectively used. The third mirror 70, the copy mirror 88 and the conversion lens 82 are movably disposed within the housing 10A so that they are prevented from interfering with any other optical systems, whereas the screen 80 is fixedly disposed at the front side of the housing 10A since it does not interfere with any other optical systems.

[Document Table]

Figure 11:
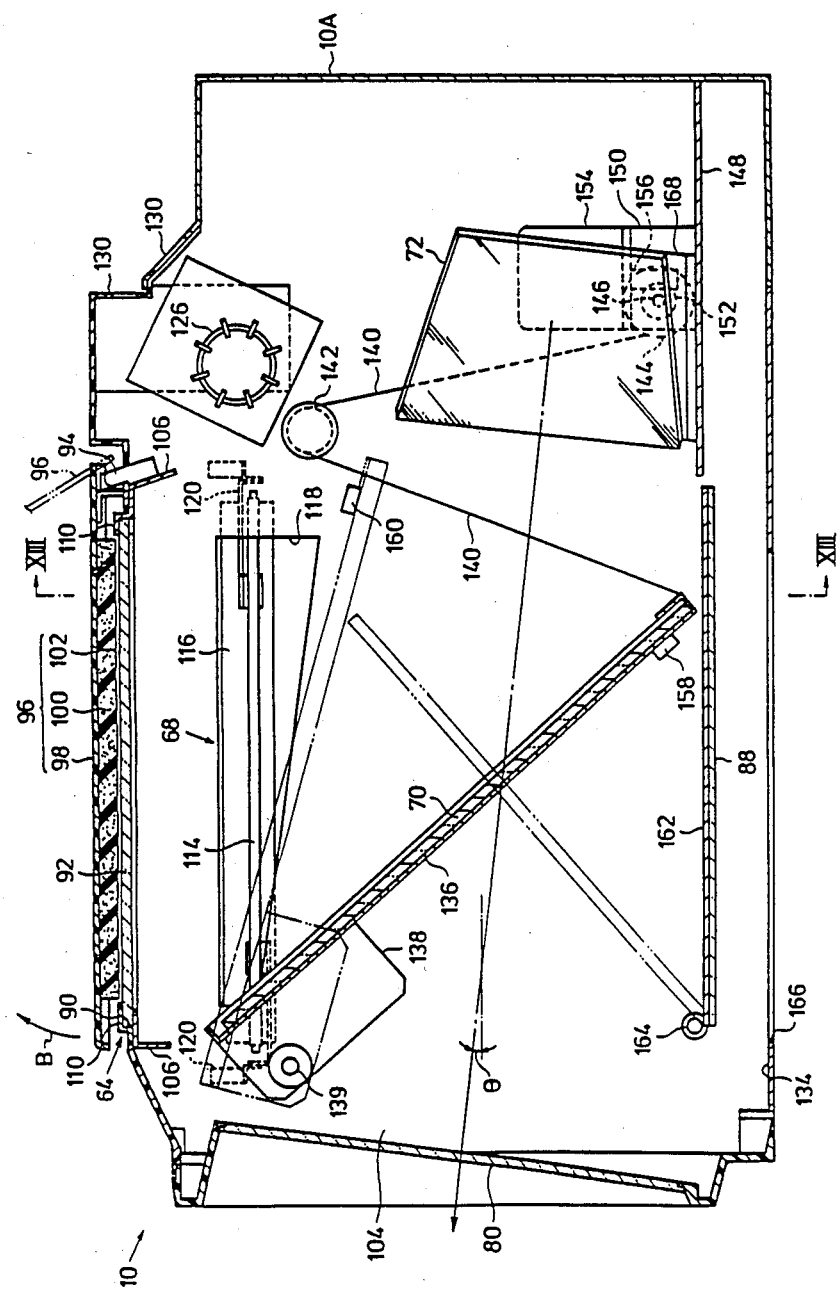

As shown in FIGS. 1 and 2, the document table 64 is disposed on the left upper side of the recording and projecting apparatus body 10. Referring to FIG. 11 (a sectional view taken along the line XI—XI in FIG. 2), the document table 64 includes a transparent glass plate 92 disposed in such a manner as to cover a relatively large upper opening 90 provided in the upper side of the housing 10A of the recording and projecting apparatus body 10, and a document pressing plate 96 which is disposed in such a manner as to cover the upper surface of the glass plate 92 and which is able to be opened in the direction of the arrow B by means of an opening and closing member 94. The document pressing plate 96 consists of a cover 98, a cushioning member 100 made of a sponge material and bonded to the cover 98, and a white pressing sheet 102 bonded to the cushioning member 100.

The glass plate 92 is supported at the periphery of the reverse side thereof by a mounting bracket 106 which is rigidly secured to side frames 104 provided on a base frame 134 in such a manner as to extend upward in opposing relation to each other. The inner surface of the bracket 106 is painted in white. It should be noted that the opening and closing member 94 is also rigidly secured to the mounting bracket 106.

Figure 12:
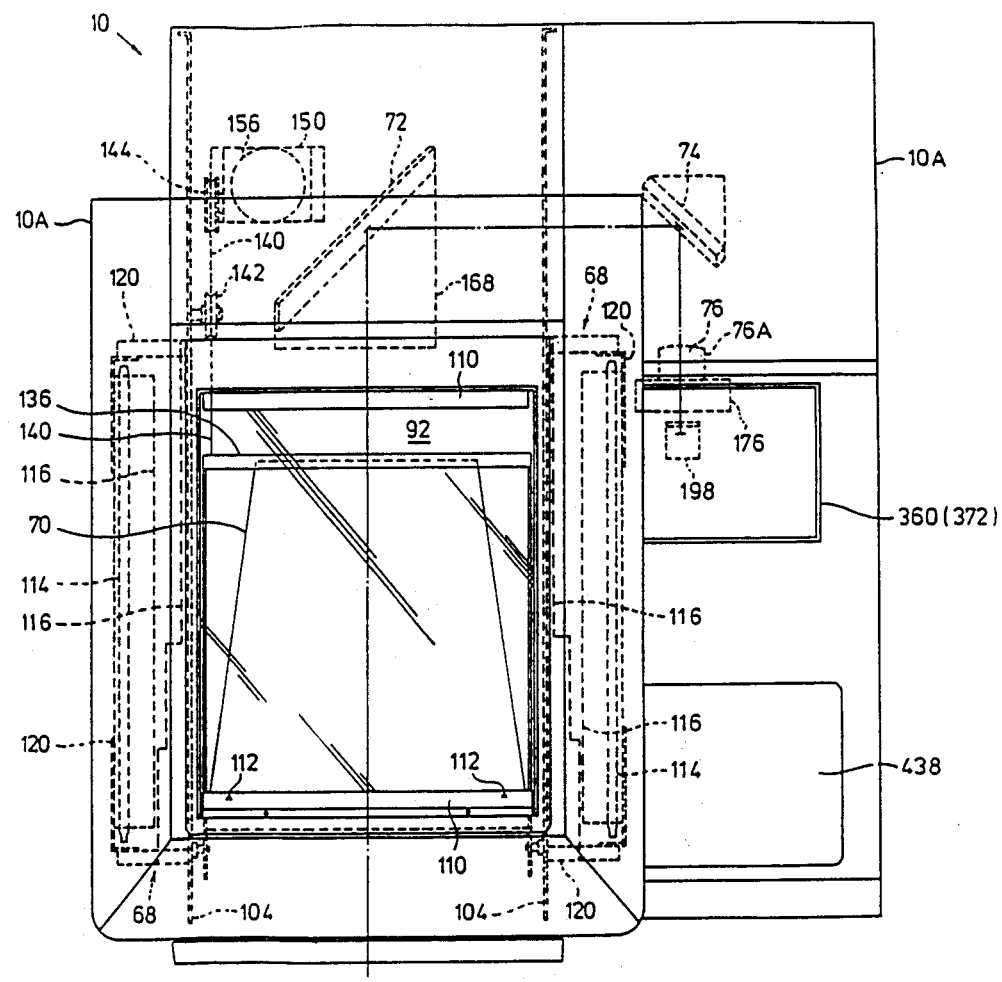

As shown in FIG. 12 (a sectional view taken along the line XII—XII in FIG. 2, showing the system with the document pressing plate 96 removed), thin-walled frame plates 110 for clamping the glass plate 92 together with the mounting bracket 106 are disposed at the front and rear end portions, respectively, on the upper side of the glass plate 92. Document positioning marks 112 are provided on the frame plate 110 positioned at the front end. The inner side surfaces of the frame plates 110 are also painted in white.

Since the respective inner sides of the mounting bracket 106 and the frame plates 110 are painted in white, when the document 66 set on the document table 64 (see FIG. 8) is recorded on the microfilm 28, the light reflected from the portions painted in white is applied to the peripheral portion of a frame of the microfilm 28 which is subjected to recording, and the peripheral portion is thereby exposed. In consequence, no black frame is produced when the frame formed with an image is developed.

[Document Illuminating Means]

Figure 13:
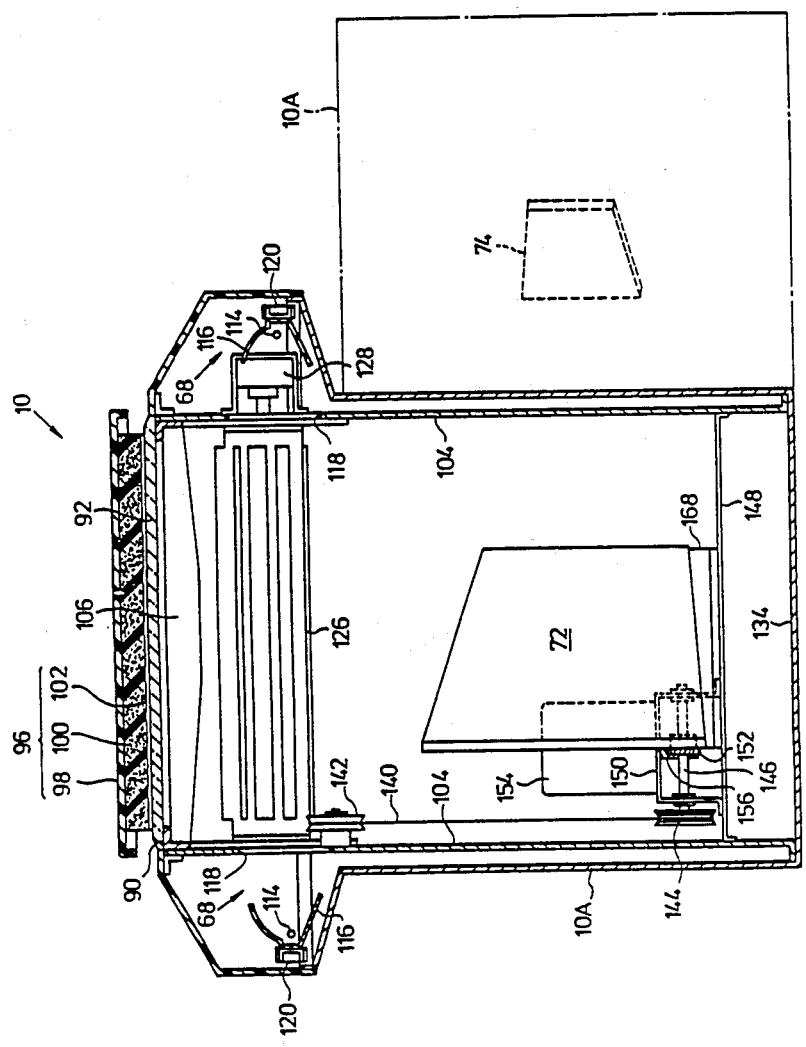

Referring to FIGS. 11, 12 and 13 (a sectional view taken along the line XIII—XIII in FIG. 11), the document illuminating means 68 is disposed below the document table 64. The document illuminating means 68 includes illuminating lamps 114, reflecting plates 116 for reflecting the light emitted from the lamps 114, and aperture masks 118 which are respectively formed in side frames 104 in order to allow the light from the lamps 114 to illuminate the document 66 (see FIG. 8) uniformly.

The illuminating lamps 114 have a tubular configuration and are disposed below and on both sides, respectively, of the glass plate 92 in such a manner that the lamps 114 extend parallel with the glass plate 92 in the longitudinal direction thereof. Both end portions of each illuminating lamp 114 are respectively supported by brackets 120 which are rigidly secured to the corresponding side frame 104. Each reflecting plate 116 is also supported by the corresponding brackets 120 and extends along the longitudinal direction of the glass plate 92 in such a manner as to cover the upper and lower and outer side portions of the corresponding lamp 114 as shown in FIG. 13. The light emitted from each illuminating lamp 114 is applied to the document 66 set on the upper surface of the glass plate 92 through the opening in the associated aperture mask 118.

Since the third mirror 70 faces the document table 64 diagonally as shown in FIG. 11, each aperture mask 118 is so designed to prevent nonuniform illumination of the document 66. More specifically, the lower edge of the opening in the mask 118 is slanted downward from the left-hand side toward the right-hand side as viewed in FIG. 11 so that the right- and left-hand portions (as viewed in FIG. 11) of the aperture mask 118 have different heights.

For the same reason as that in the case of the aperture masks 118, a portion of the reflecting plate 116 which is positioned below the illuminating lamp 114 is, as shown in FIG. 12, enlarged stepwise in width so as to increase the reflecting area from the lower side toward the upper side as viewed in FIG. 12 for the purpose of preventing lowering in the illuminance of the light reflected from the document 66 and made incident on the lower end portion of the third mirror 70. The configuration of this portion of the reflecting plate 116 is not necessarily limited to a step-like configuration, and said portion may, of course, be tapered as shown in FIG. 13B.

To prevent lowering in illuminance at the central portion of the document 66 located at a position which is remote from both the illuminating lamps 114 (the central position between the right and left illuminating lamps 114 as viewed in FIG. 13), the central portion of the mounting bracket 106 is, as shown in FIG. 13, extended downward more than the other portions thereof so that the bracket 106 functions as an auxiliary reflecting plate.

As shown in FIGS. 11 and 13, a cooling fan 126 is disposed inside the housing 10A of the recording and projecting apparatus body 10 in such a manner that both end portions of the fan 126 are respectively supported by the side frames 104 disposed in opposing relation to each other. The cooling fan 126 is provided for the purpose of cooling the illuminating lamps 114 which have heated up and the atmosphere inside the housing 10A which has been raised in temperature by the lamps 114. The cooling fan 126 is driven by a motor 128 secured to the reverse side of one side frame 104 as shown in FIG. 13 so as to discharge the warm air inside the housing 10A through a louver 130 shown in FIG. 11.

[Screen Mirror Lens]

As shown in FIGS. 1 and 2, the screen 80 is disposed at the left front side of the recording and projecting apparatus body 10 in such a manner that a line perpendicular to the surface of the screen 80 is inclined at an angle $\theta$ with respect to a base frame 134 of the body 10 as shown in FIG. 11. The screen 80 is of the rear projection type in which an image which is projected from the rear side of the screen 80 is viewed as transmitted light from the front side, i.e., the outside, of the screen 80.

Referring to FIG. 12, the third mirror 70 is defined by a trapezoidal plane mirror, and fixed to a mirror frame 13 as shown in FIGS. 11 and 12. Brackets 138 are rigidly secured to both lateral edges, respectively, of the left-hand end portion (as viewed in FIG. 11) of the mirror frame 136. The brackets 138 are pivotally supported through pins 139 by the opposing side frames 104, respectively. One end of a wire 140 is retained by the right-hand end (as viewed in FIG. 11) of the mirror frame 136, i.e., the free end thereof. The intermediate portion of the wire 140 is wrapped around a pulley 142 which is rotatably supported by one side frame 104, and the other end of the wire 140 is retained by a take-up pulley 144.

The take-up pulley 144 is, as shown in FIG. 13, rigidly secured to one end portion of a shaft 146. The shaft 146 is rotatably supported by a bracket 150 with a substantially hat-shaped cross-section which is rigidly secured to a first subbase frame 148. A worm wheel 152 is rigidly secured to the intermediate portion of the shaft 146. The worm wheel 152 is meshed with a worm 156 which is rigidly secured to the shaft of a motor 154 mounted on the bracket 150. It should be noted that the first subbase frame 148 is rigidly secured at both ends thereof to the opposing side frames 104, respectively, the frame 148 being positioned above the base frame 134.

The third mirror 70 is pivoted together with the mirror frame 136 which is pivoted about the pins 139 in response to the movement of the wire 140 which is wound up and unwound from the take-up pulley 144, between the lower-limit position shown by the solid line in FIG. 11 and the upper-limit position shown by the chain line in the same figure. Lower and upper limit switches 158 and 160 are secured to one side frame 104, the switches 158 and 160 being adapted to come in contact with the mirror frame 136 at the lower and upper limit positions, respectively, of the third mirror 70.

As shown in FIG. 11, the copy mirror 88 is disposed below the third mirror 70. The copy mirror 88 is defined by a trapezoidal plane mirror in a manner similar to that of the third mirror 70, but the left-hand edge (as viewed in FIG. 11) of the copy mirror 88 defines the shorter side of the trapezoidal configuration in a manner contrary to that of the third mirror 70 (see FIGS. 8 and 10 in comparison with each other). The copy mirror 88 is rigidly secured to a mirror frame 162. Both lateral edges of the left-hand end portion (as viewed in FIG. 11) of the mirror frame 162 are pivotally supported by the opposing side frames 104 through pins 164, respectively.

The copy mirror 88 is interlocked with a drive system (not shown) of the copying machine 12 so that the mirror 88 is pivoted between the lower-limit position shown by the solid line in FIG. 11 and the upper-limit position shown by the chain line in the same figure.

The base frame 134 is provided with a bottom opening 166. The recording and projecting apparatus body 10 and the copying machine 12 (shown in FIGS. 1 and 2) are spatially communicated with each other through the bottom opening 166 and another opening 166A (see FIG. 23) provided in the copying machine 12.

As shown in FIGS. 11 and 12, the second mirror 72 is defined by a trapezoidal plane mirror and rigidly secured to the first subbase frame 148 through a bracket 168. The second mirror 72 is inclined at an angle θ with respect to the base frame 134 in a manner similar to that of the screen 80 and at the same time, the second mirror 72 is inclined at angle of 45° with respect to the longitudinal axis of the recording and projecting apparatus body 10.

Figure 14:
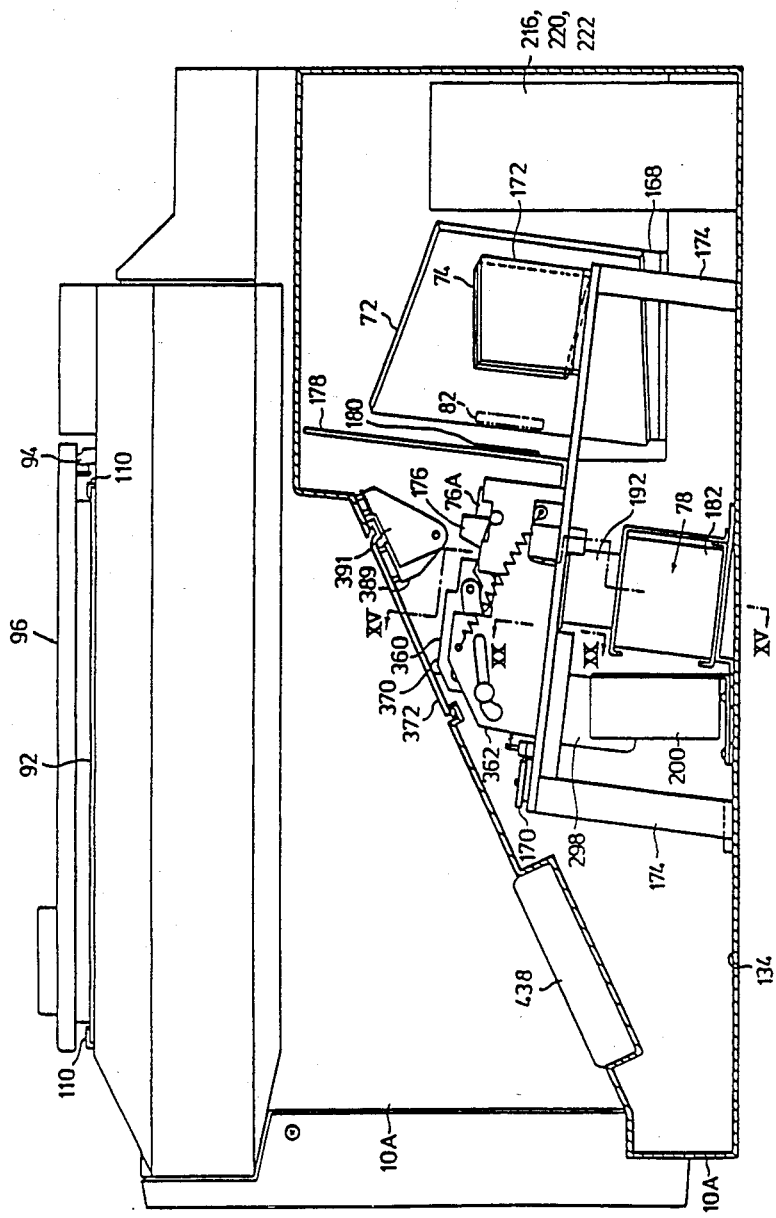

As shown in FIGS. 12 and 14 (a sectional view taken along the line XIV—XIV in FIG. 2), the first mirror 74 is similarly defined by a trapezoidal plane mirror and rigidly secured to a second subbase frame 170 (see FIG. 14) through a bracket 172. The first mirror 74 is inclined at an angle θ with respect to the base frame 134 and at the same time, the mirror 74 is inclined at an angle of 45° with respect to the longitudinal axis of the recording and projecting apparatus body 10 as shown in FIG. 12 in a manner similar to that of the second mirror 72. The second subbase frame 170 is, as shown in FIG. 14, rigidly secured to the base frame 134 at an angle of inclination θ through stays 174.

As shown in FIG. 14, the main lens 76 is incorporated in a lens tube 76A and rigidly secured to the second subbase frame 170 together with a processing head 176 in one unit. The main lens 76 is disposed in such a manner that the optical axis thereof is inclined at an angle θ with respect to the base frame 134.

The conversion lens 82 is, as shown in FIG. 14, disposed between the first mirror 74 and the main lens 76, and adapted to be movable by a moving mechanism (not shown) between two positions, that is, a position at which the optical axis thereof is coincident with that of the main lens 76 and a position at which the lens 82 does not interfere with the lens 76.

As shown in FIG. 14, a bulkhead 178 is provided on the second subbase frame 170 in such a manner as to extend in a direction perpendicular to the frame 170, and a shutter 180 is disposed on the bulkhead 178 so that it is possible to shut the optical path defined between the main lens 76 and the first mirror 74. The shutter 180 is connected to an automatic exposure controller (not shown).

[Projecting Light Source Section]

Figure 15:
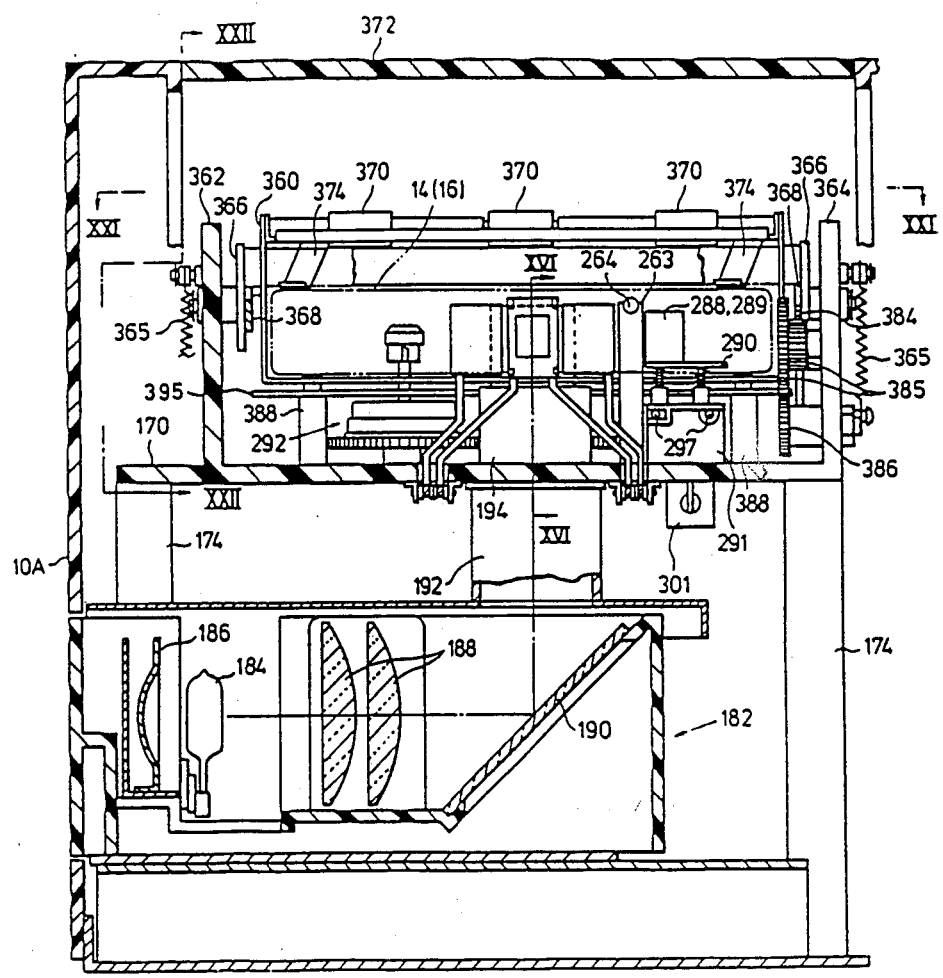

Referring to FIGS. 14 and 15 (a sectional view taken along the lines XV—XV in FIGS. 14 and 21, described later), a lamp box 182 is disposed in the projecting light source section 78. The lamp box 182 is, as shown in FIG. 15, provided with a halogen lamp 184 which defines a light sourse, a reflecting plate 186 disposed to the rear of the halogen lamp 184, condenser lenses 188 for condensing the light emitted from the halogen lamp 184, and a lower projecting mirror 190 adapted to reflect the light from the halogen lamp 184 at a right angle so that the light is projected upward.

It should be noted that a part of the lamp box 182 defines a part of a side wall of the housing 10A of the recording and projecting apparatus body 10 as shown in FIGS. 1 and 15 so that the lamp box 182 can readily be removed from the body 10 when, for example, the lamp 184 is replaced with a new one.

Figure 16:
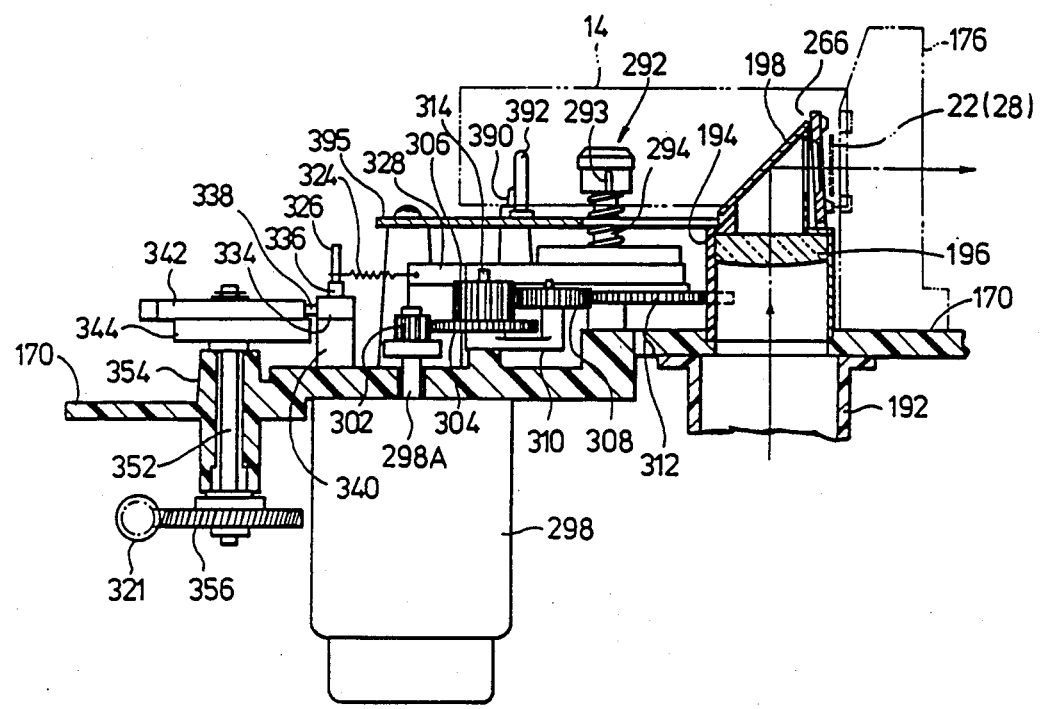

The projecting light source section 78 consists of the lamp box 182, a tubular member 192, a tubular member 194 (see FIG. 15), and a condenser lens 196 as well as an upper projecting mirror 198 respectively supported by the intermediate and upper portions of the tubular member 194 as shown in FIG. 16 (a sectional view taken along the line XVI—XVI line in FIG. 15). The tubular member 192 is suspended from the second subbase frame 170 in such a manner that the tubular member 192 extends between the frame 170 and the lamp box 182 to prevent scattering of the light from the halogen lamp 184 which passes through the inside of the tubular member 192.

The tubular member 194 is provided on the second subbase frame 170 in such a manner as to project upward therefrom. The inside of the tubular member 194 is communicated with that of the tubular member 192, and an opening is provided in the upper part of the tubular member 194 so as to face the processing head 177 as shown in FIG. 16. Thus, the light from the halogen lamp 184 is first reflected by the lower projecting mirror 190 and condensed by the condenser lens 196 so as to be incident on the upper projecting mirror 198 from the lower side thereof, and the upper projecting mirror 198 reflects the light at a right angle so that the reflected light is projected toward the processing head 176.

As shown in FIG. 14, a cooling fan 200 is rigidly secured to the base frame 134 adjacent to the lamp box 182. The fan 200 is provided for the purpose of cooling the halogen lamp 184 which has heated up and the atmosphere within the housing 10A which has been raised in temperature by the halogen lamp 184. The warm air inside the housing 10A is discharged from a louver 202 shown in FIG. 1.

[Processing Head]

Figure 17:
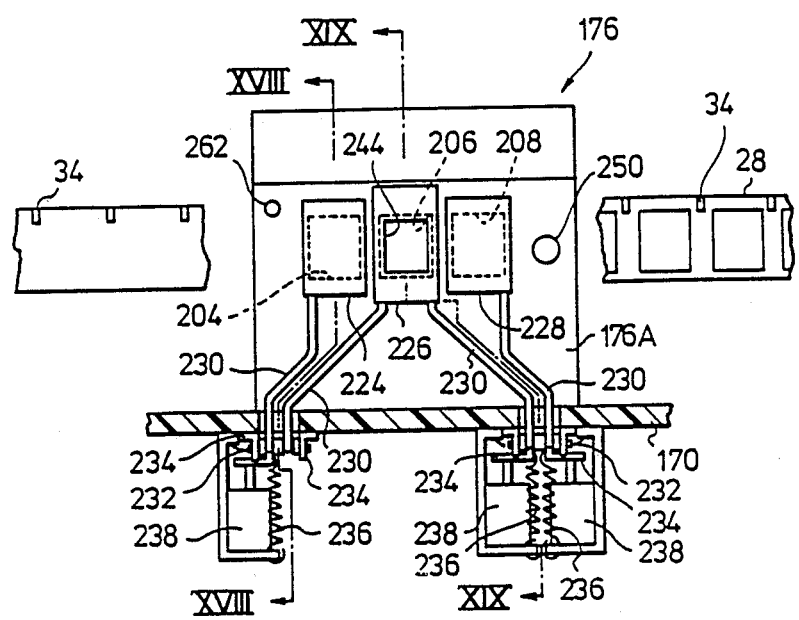

Referring to FIGS. 14 and 16, the processing head 176 is rigidly secured to the second subbase frame 170 in such a manner that the processing head 176 is disposed adjacent to the tubular member 194 as shown in FIG. 16. The processing head 176 is, as shown in FIGS. 17 (a sectional view taken along the line XVII—XVII in FIG. 21 described later) to 19, provided with a preheating chamber 204, an exposing/projecting chamber 206 and a developing chamber 208 in that order. Each of these chambers 204, 206 and 208 has a rectangular opening provided in the front wall 176A of the processing head 176, and the opening pitch is equivalent to the frame pitch of the microfilm 28.

Figure 18:
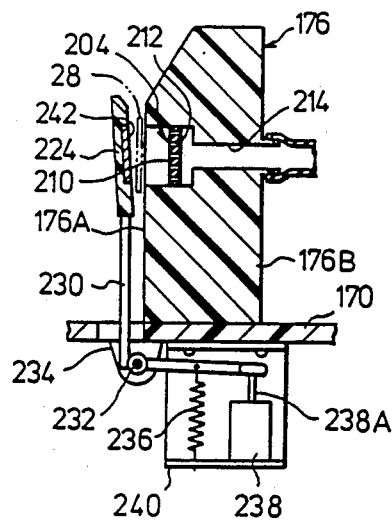

As shown in FIG. 18, the preheating chamber 204 has a porous plate 210 disposed therein so as to partition the chamber 204 into two chamber portions, i.e., right and left chamber portions as viewed in FIG. 18. The plate 210 is provided with a multiplicity of minute bores 212 which extend through the plate 210 in the direction of thickness thereof. An air inlet passage 214 is communicated with the right chamber portion. The air inlet passage 214 is connected to an air pump 216 shown in FIG. 14.

Figure 19:
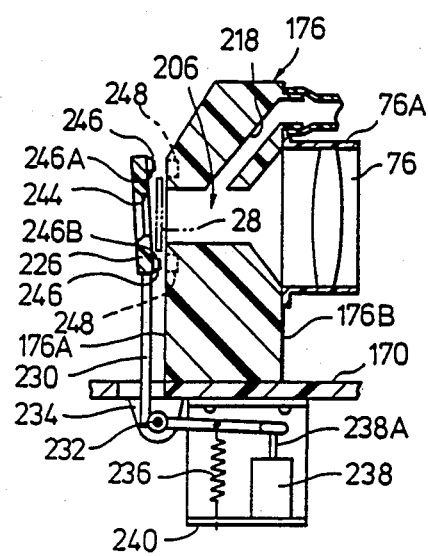

Referring to FIG. 19, an air inlet passage 218 is communicated with the exposing/projecting chamber 206. The passage 218 is connected to an air pump 210 shown in FIG. 14. The exposing/projecting chamber 206 has another opening which is provided in the rear wall 176B of the processing head 176. The main lens 76 is disposed in opposing relation to the second opening of the chamber 206. The main lens 76 is supported by a lens tube 76A secured to the rear wall 176B. The exposing/projecting chamber 206 is, as shown in FIG. 16, disposed so as to face the upper projecting mirror 198 supported by the tubular member 194.

The developing chamber 208 has the same structure as that of the preheating chamber 204, and an air inlet passage which is communicated with the chamber 208 is connected to an air pump 222 shown in FIG. 14.

Pressing plates 224, 226 and 228 are disposed on the side of the processing head 176 which is closer to the front wall 176A so as to face the respective openings of the preheating, exposing/projecting and developing chambers 204, 206 and 208, respectively.

The pressing plates 224 and 228, which are disposed in opposing relation to the preheating and developing chambers 204 and 208, have the same structure as each other. As shown in FIG. 18, a planar heating element 242 is disposed on the side of each of the pressing plates 224 and 228 on the side thereof which faces the front wall 176A. The heating element 242 is formed by coating an electrical resistor such as carbon in the shape of a film, and adapted to generate heat uniformly when supplied with electric current.

The pressing plate 226 which is disposed so as to face the exposing/projecting chamber 206 has a rectangular through-hole 244 formed in its center. Further, projections 246 ar formed in four corners of the side of the pressing plate 226 which faces the front wall 176A. The lower surface 246A of each of the upper projections 246 is defined by a slanted surface which is tapered toward the distal end of the projection 246. On the other hand, the upper surface 246B of each of the lower projections 246 is defined by a slanted surface which is tapered toward the distal end of the projection 246. The distance between the respective root portions of the upper and lower surfaces 246A and 246B is set so as to be slightly longer than the width of the microfilm 28.

Arms 230 are respectively connected to the pressing plates 224, 226 and 228, and the intermediate portion of each arm 230 is pivotally supported by a shaft 232 which, in turn, is supported by a bracket 234 rigidly secured to the reverse side of the second subbase frame 170. A tension coil spring 236 is secured to one end portion of each of the arms 230 except for one of the two arms 230 connected to the pressing plate 226. Thus, the arms 230 are pivoted by the biasing forces from the respective springs 236, thus causing the pressing plates 224, 226 and 228 to be moved in the clockwise direction from the position shown in FIGS. 18 and 19.

The pressing plates 224 and 228, which are biased clockwise, are positioned so that the heating elements 242 close the openings of the preheating and developing chambers 204 and 208, respectively. The pressing plate 226, which is also biased clockwise, has its projections 246 fitted into recesses 248 formed in the front wall 176A of the processing head 176, so that the through-hole 244 is positioned in the center of the opening of the exposing/projecting chamber 206 (the through-hole 244 is a size smaller than the opening of the exposing/projecting chamber 206).

A push-type solenoid 238 is disposed in such a manner that its plunger 238A is engaged with the end portion of each arm 230 on the side thereof which is connected to the corresponding tension coil spring 236. Each solenoid 238 is supported by a bracket 240 which is rigidly secured to the reverse side of the second subbase frame 170. It should be noted that one end portion of each of the springs 236 is also retained by the bracket 240.

When the solenoids 238 are energized, the plungers 238A are projected upward to push up the lower end portions of the corresponding arms 230 as shown in FIGS. 18 and 19 against the biasing forces from the tension coil springs 236, thereby pivoting the arms 230 counterclockwise, and thus allowing the pressing plates 224, 226 and 228 to separate from the processing head 176.

The processing head 176 has a blip sensor 262 which is disposed at a position on the left-hand end portion thereof (as viewed in FIG. 17) which is slightly above the upper end of the opening of the preheating chamber 204 and the like. The blip sensor 262 is defined by a light-receiving element and faces a sensor light source 264 disposed on a side pillar 263 which is disposed to one side of the tubular member 194 (see FIG. 15). Further, an optical sensor 250 for checking developing conditions and whether or not recording has been completed is disposed on the front wall 176A at a position which is on the right-hand side as viewed in FIG. 17 and on the same level as the central portion of the opening of the developing chamber 208 and the like.

[Magnetic Head]

Figure 21:
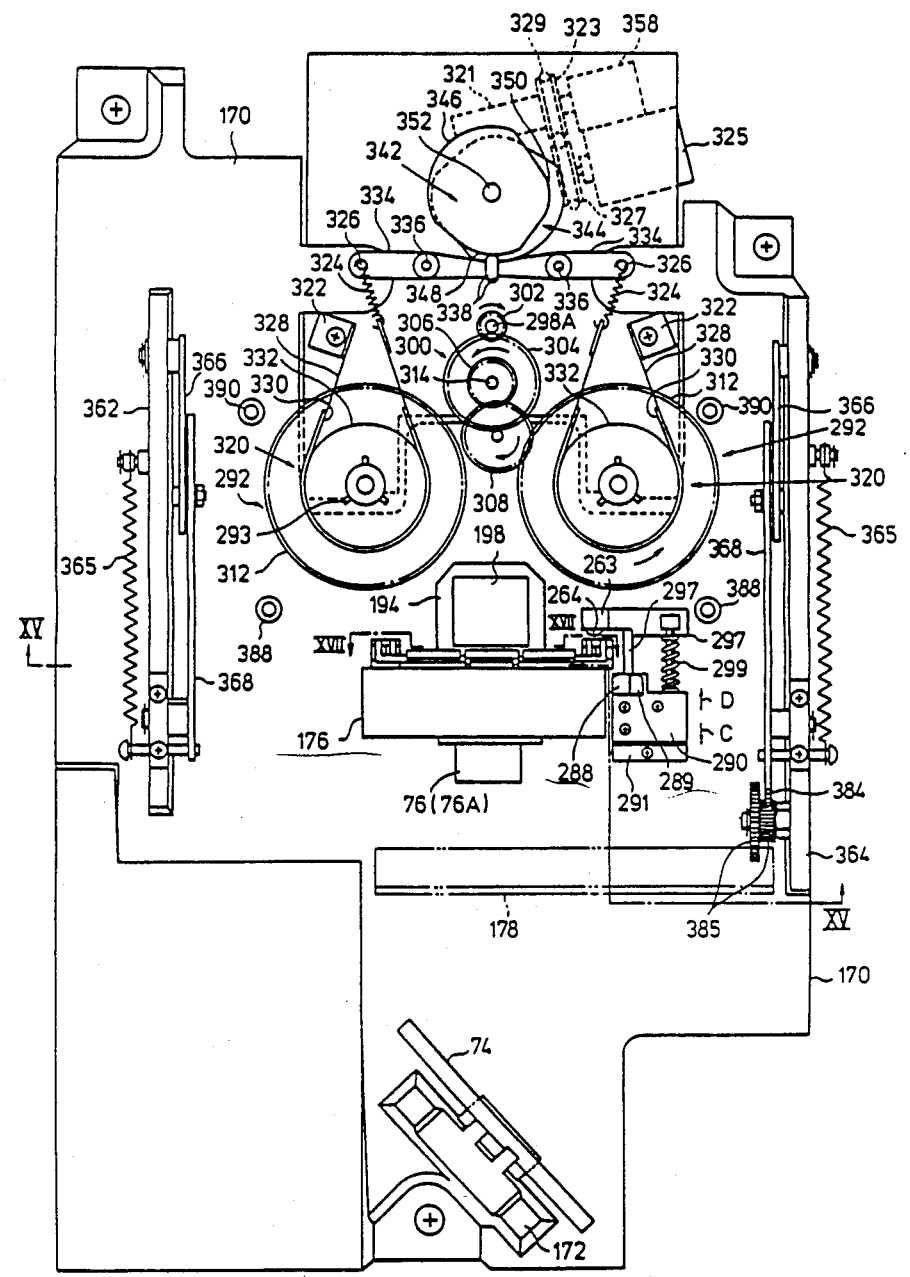

Referring to FIG. 21 (a sectional view taken along the line XXI—XXI in FIG. 15), a recording and reproducing magnetic head 288 and an erasing magnetic head 289 for the magnetic tape 26 are disposed adjacent to the processing head 176. The magnetic heads 288 and 289 are secured to a bracket 290 which, in turn, is mounted on a base 291 rigidly secured to the second subbase frame 170. The bracket 290 is adapted to be movable along a shaft 297 which is supported by the second subbase frame 170 through a member 295.

The bracket 290 is biased in the direction of the arrow C by means of a compression coil spring 299 wound on the shaft 297. However, when a solenoid 301, which is rigidly secured to the reverse side of the second subbase frame 170 as shown in FIG. 15, is energized, the bracket 290 is moved in the direction of the arrow D against the biasing force of the spring 299. The recording and reproducing magnetic head 288 and the erasing magnetic head 289 are positioned at the same level as that of the exposing/projecting chamber 206 and other chambers.

[Tape Driving Section]

Figure 20:
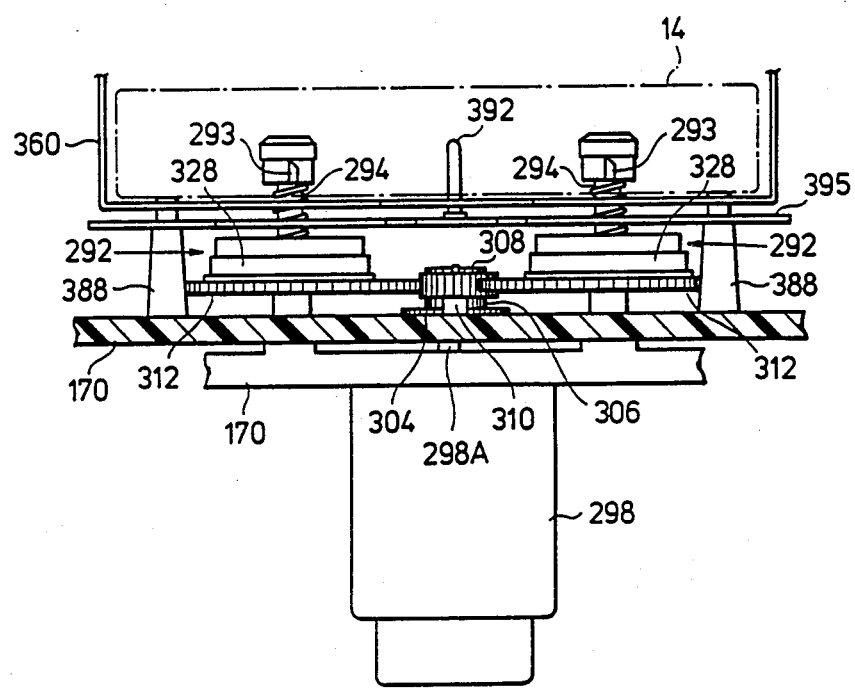

Referring to FIG. 20 (a sectional view taken along the line XX—XX in FIG. 14) and FIG. 21, a pair of reel tables 292 are disposed on the second subbase frame 170. Reel engaging projections 293 project radially from the top of each reel table 292. Each reel table 292 is rotatably supported by the second subbase frame 170 through a pin 294. Both the reel tables 292 can be rotated by a motor 298 (see FIG. 20) disposed on the reverse side of the second subbase frame 170 through a driving force transmission mechanism 300.

As shown in FIGS. 16 and 21, the transmission mechanism 300 consists of a gear 302 rigidly secured to a shaft 298A of the motor 298, a first intermediate gear 304, a second intermediate gear 306, a third intermediate gear 308, an oscillating plate 310, and gears 312 which are defined by the respective lower disk portions of the reel tables 292.

The first and second intermediate gears 304 and 306 are coaxially connected together in one unit and rotatably supported by a pin 314 which projects upward from the second subbase frame 170. The oscillating plate 310 is interposed between the second subbase frame 170 and the first intermediate gear 304 and pivotally supported by the pin 314. The third intermediate gear 308 is rotatably supported by the oscillating plate 310.

The gear 302 is meshed with the first intermediate gear 304, and the second intermediate gear 306 is meshed with the third intermediate gear 308 which, in turn, is meshed with either one of the gears 312 on the reel tables 292 in accordance with the direction of rotation of the motor 298.

As shown in FIG. 21, a band brake 320 for applying back tension to the tape 22 is disposed on each of the reel tables 292. The band brake 320 has a steel sheet band 328 retained at one end thereof by the second subbase frame 170 through a retainer piece 322, the other end of the band 328 being retained by a pin 326 through a tension coil spring 324. A felt brake shoe 330 is bonded to the bond 328. The brake shoe 330 is tightly wound on a cylindrical portion 332 of the reel table 292 under pressure by means of the tensile force applied from the tension coil spring 324.

The pin 326 projects upward from one end of an arm 34. The intermediate portion of the arm 334 is pivotally supported by a pin 336 projecting upward from the second subbase frame 170. An abutment piece 338 is formed at the other end of the arm 334. The band brakes 320 are respectively disposed on the pair of right and left reel tables 292 in symmetry with each other. As shown in FIG. 16, each arm 334 has a collar 340 which if fitted on the associated pin 336 to separate the arm 334 from the surface of the second subbase frame 170. Since the respective collars 340 of the two arms 334 have different heights, the arms 334 are disposed at different levels, so that their respective abutment pieces 338 overlap each other without any interference.

The abument pieces 338 positioned in overlapping relation to each other are in pressure contact with cam plates 342 and 344, respectively, Each of the cam plates 342 and 344 has a large-diameter portion 346, intermediate-diameter portion 348, and a small-diameter portion 350. The two cam plates 342 and 344 have the same configuration and are rigidly secured to a shaft 352 in such a manner that one of them is turned upside down and made out of phase from the other. The shaft 352 is received and thereby rotatably supported by a bearing portion 354 formed on the second subbase frame 170, the lower end portion of the shaft 352 projecting form the reverse side of the frame 170.

A worm wheel 356 is rigidly secured to the lower end portion of the shaft 352. The worm wheel 356 is meshed with a worm 321 which is rotatably supported in a cantilever fashion by a bearing member 358 secured to the reverse side of the second subbase frame 170. A pulley 323 is rigidly secured to a shaft which supports the worm 321. The pulley 323 is connected through a transmission belt 329 to a pulley 327 which is rigidly secured to the shaft of a motor 325 mounted on the reverse side of the second subbase frame 170.

[Cassette Loading Section]

Figure 22:
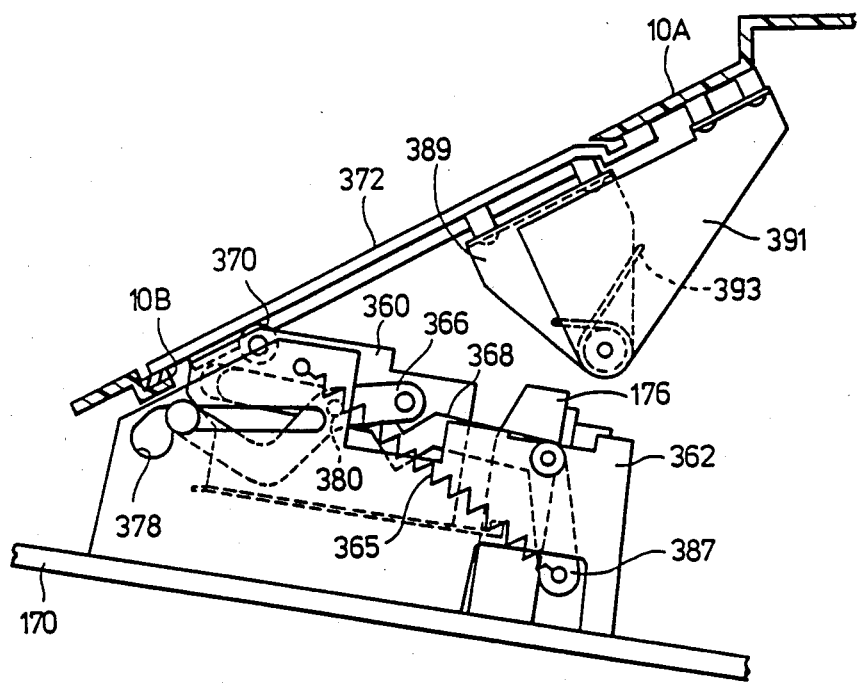

Referring to FIGS. 15 and 22 (a sectional view taken along the line XXII—XXII in FIG. 15), the cassette loading section has a cassette holder 360 for holding the cassette 14, cassette holder brackets 362, 364 which project upward from the second subbase frame 170 to support the cassette holder 360, and a pair of first arms 366 and a pair of second arms 368, which connect the cassette holder 360 and the cassette holder brackets 362, 364.

Retainer members 374 made from metal leaf springs and adapted to resiliently retain the cassette 14 are secured to the right and left end portions, respectively, of the cassette holder 360. In addition, rollers 370 are rotatably disposed on the cassette holder 360. The cassette holder brackets 362 and 364 are respectively positioned on both outer sides of the pair of reel tables 292. As shown in FIG. 22, one end portion of each of the first arms 366 is movably supported by a slot 378 provided in the corresponding cassette holder bracket 362 or 364, and one end portion of each of the second arms 368 is pivotally supported by the bracket 362 or 364.

Figure 22A:
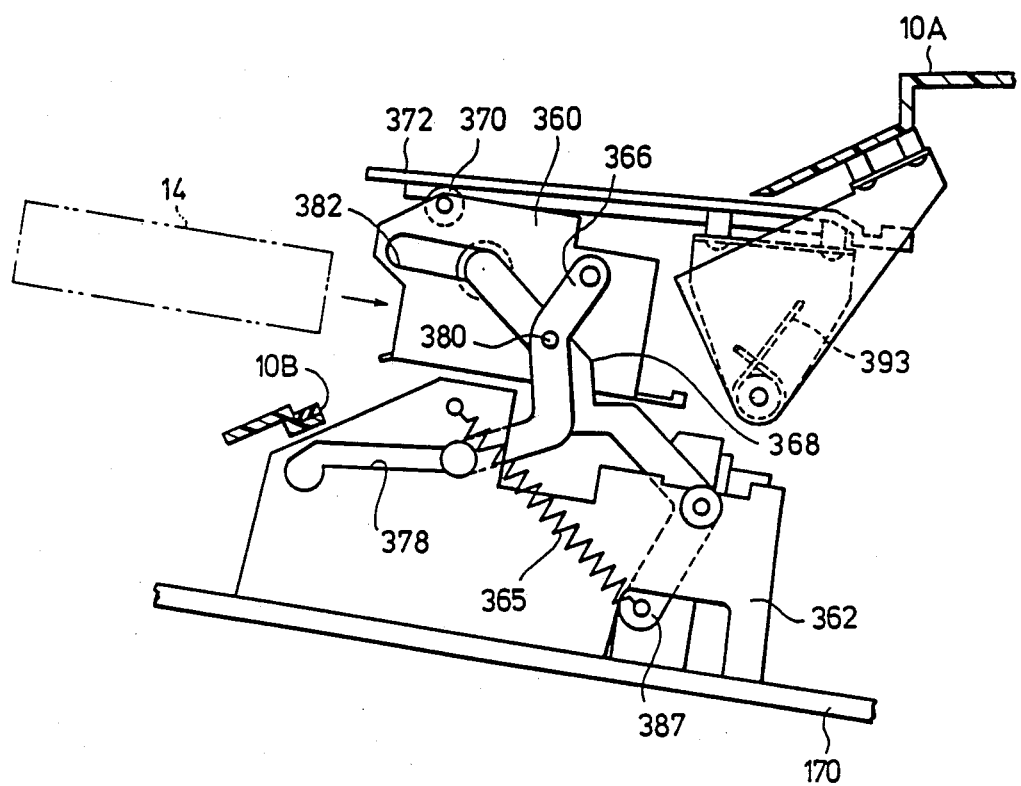
FIG. 22A illustrates the arrangement shown in FIG. 22 in an operative state, which corresponds to a sectional view taken along the line XXII—XXII in FIG. 15.

The corresponding first and second arms 366 and 368 are disposed in such a manner as to intersect each other, and pivotally connected together at the intersection by means of a pin 380. The other end portion of each of the first arms 366 is pivotally connected to the cassette holder 360. The other end portion of each of the second arms 368 is movably supported by a slot 382 provided in the cassette holder 360, as shown in FIG. 22A.

A sector gear 384 is, as shown in FIG. 21, formed on one end portion of one of the second arms 368 on the side thereof which is closer to the position at which said arm 368 is pivotally connected to the associated cassette holder bracket 364. The sector gear 384 is meshed with a gear 385 which, in turn, is meshed with a rotary damper 386 as shown in FIG. 15. Both the gear 385 and the rotary damper 386 are secured to the cassette holder bracket 364.

In addition, each of the second arms 368 has a lever 387 extending from one end portion thereof which is closer to the position at which the arm 368 is pivotally connected to the corresponding cassette holder bracket 362 or 364. One end of a tension coil spring 365 is retained by the lever 387. The other end of the spring 365 is retained by the cassette holder bracket 362 or 364. Thus, each of the second arms 368 is biased so as to pivot clockwise as viewed in FIG. 22 about the position at which the arm 368 is pivotally connected to the corresponding cassette holder bracket 362 or 364, but the arm 368 is locked in the position shown in FIG. 22 by virtue of a stopper mechanism (not shown).

An opening 10B is provided in that portion of the housing 10A of the recording and projecting apparatus body 10 which is positioned above the cassette holder 360, and a cover 372 is disposed at the opening 10B. The cover 372 is pivotally mounted to the housing 10A through brackets 389 and 391 which are pivotally connected to each other. The cover 372 is biased counterclockwise as viewed in FIG. 22 by means of a torsion coil spring 393, and normally covers the opening 10B as shown in FIG. 22. In this state, the rollers 370 are in contact with the reverse side of the cover 372.

As shown in FIG. 21, two pairs of cassette positioning pins 388 and 390 are provided on the second subbase frame 170 in such a manner as to project upward around the reel tables 292. The top surfaces of the cassette positioning pins 388 abut against the positioning projections 56A, respectively, which are formed on the reverse surface of the cassette casing 16, thereby effecting positioning of the cassette 14 in the heightwise direction thereof, and the cassette positioning pins 390 are respectively fitted into the positioning holes 56B to effect positioning of the cassette 14 in the lateral direction thereof (in the direction which intersects both the pair of reel tables 292).

In addition, a cover 395 covers the reel tables 292 and the gears and other members of the transmission mechanism 300, and a brake release pin 392 which releases the brake mechanism of the cassette 14 is provided on the cover 395 so as to project therefrom upwardly.

[Copying Machine]

Figure 23:
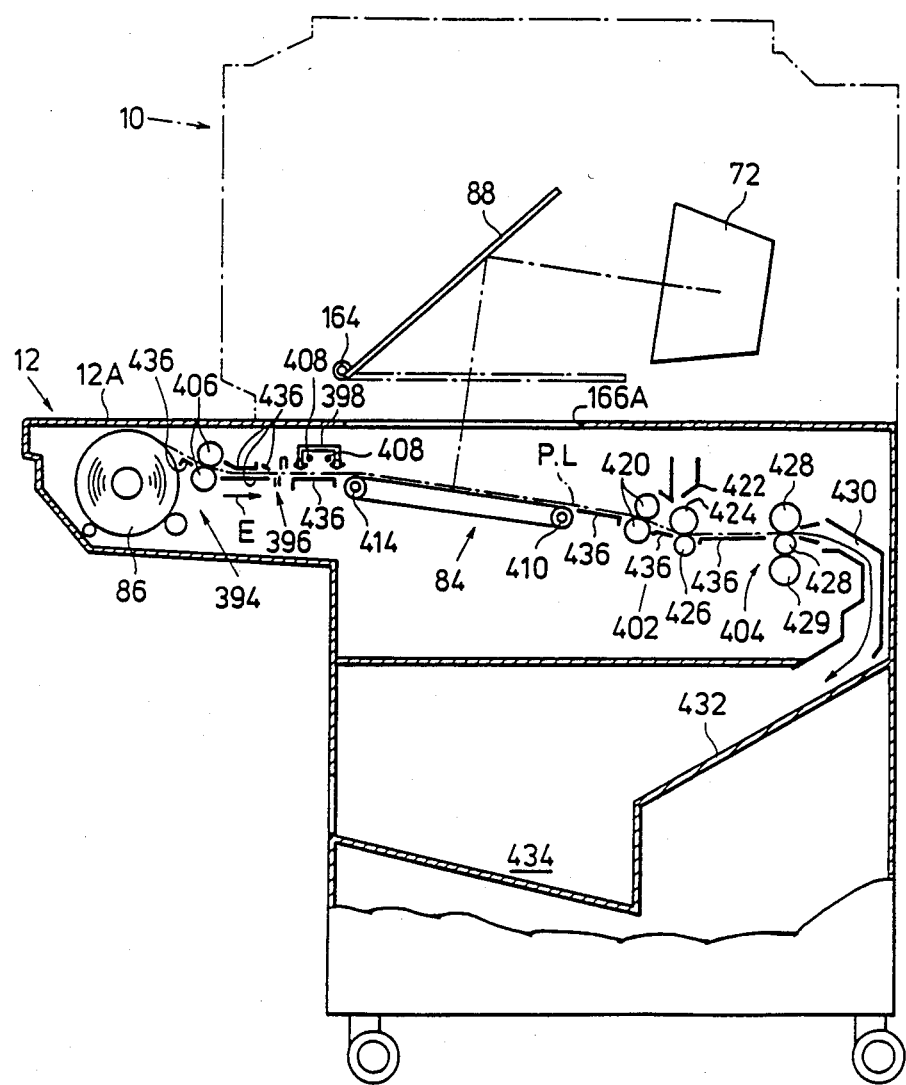

Referring to FIG. 23 (a sectional view taken along the line XXIII—XXIII in FIG. 2), the copying machine 12 has a paper feed section 394 in which a copying paper 86 (CPC paper) in the shape of a roll is disposed, a cutter 396 for cutting the copying paper 86 into sheets, a charging device 398 for charging each sheet of copying paper 86 cut by the cutter 396, the exposing table 84 for supporting the charged sheet of copying paper 86 at an exposing position, a developing device 402 for developing the exposed sheet of copying paper 86, and a fixing device 404 for fixing the developed sheet of copying paper 86.

Figure 24:
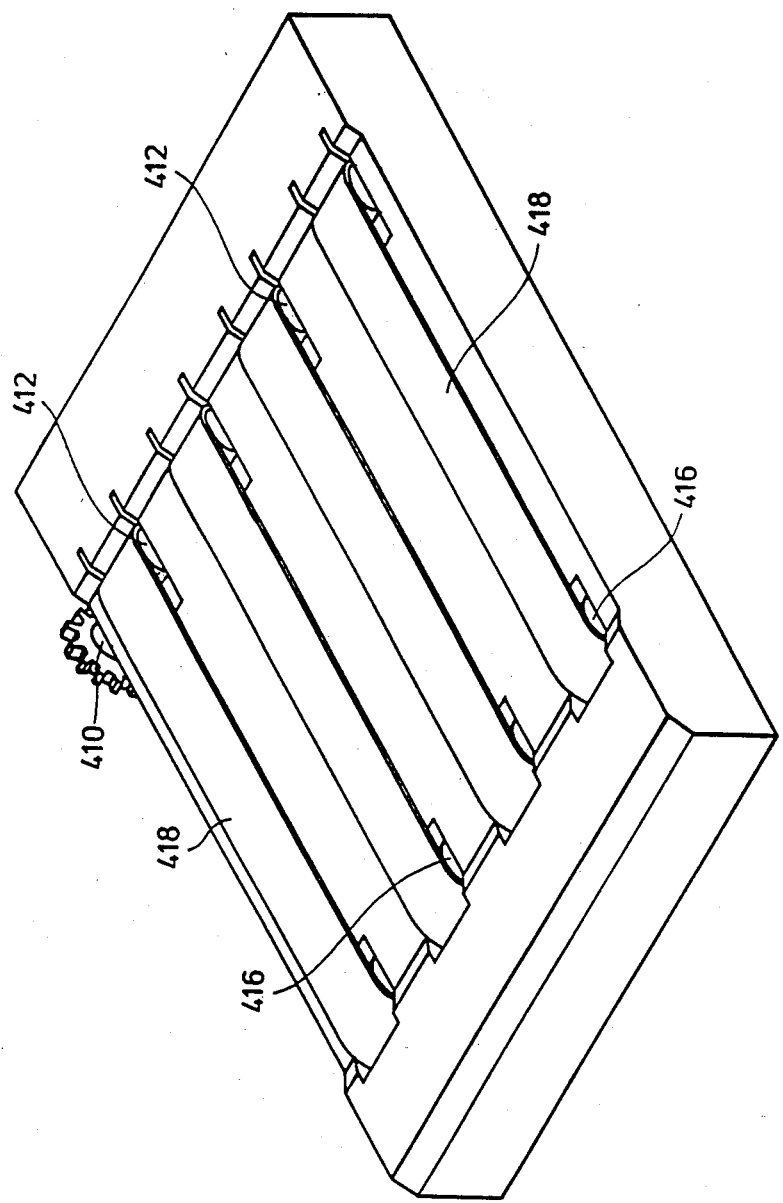

A pair of feed rollers 406 are disposed in the paper feed section 394 to unwind the copying paper 86 in the shape of a roll and transport the paper 86 in the direction of the arrow E. A clutch (not shown) is associated with the feed rollers 406. Corona wires 408 for effecting corona discharge are disposed in the charging device 398. The exposing table 84 is disposed below the copy mirror 88 and has, as shown in FIG. 24, crowned rollers 412 provided in a row on a driving shaft 410, crowned rollers 416 provided in a row on a driven shaft 414 (see FIG. 23), and endless belts 418 respectively stretched between the pairs of rollers 412 and 416.

The developing device 402 has a pair of feed rollers 420, a toner tank 422 storing toner, a toner roller 424 to the peripheral surface of which is attached the toner from the toner tank 422, and a feed roller 426 disposed in opposing relation to the toner roller 424. The fixing device 404 consists of a pair of pressure rollers 428 and a back-up roller 429.

On the downstream side of the fixing device 404 are disposed a delivery passage 430 for guiding the sheet of copying paper 86 having been subjected to fixing process, a slope 432 for guiding the sheet 86 passed through the delivery passage 430, and a paper stacker 434 which has an opening provided in the front side of the copying machine 12.

It should be noted that, in FIG. 23, the reference numeral 436 denotes a guide plate for guiding each sheet of copying paper 86, and the reference symbol P.L denotes a path line of the copying paper 86.

In addition, the feed rollers 406 in the paper feed section 394, the driving shaft 410 in the exposing table 84, the feed rollers 420, 426 and the toner roller 424 in the developing device 402, and the pressure rollers 428 and the back-up roller 429 in the fixing device 404 are simultaneously driven by means of a power transmitted thereto from a driving gear (not shown).

The copy mirror 88 is biased counterclockwise as viewed in FIG. 23 by the action of a biasing means (not shown), but when the copying machine 12 is in an inoperative state, the copy mirror 88 is pulled by a wire connected to a cam mechanism activated by the driving gear incorporated in the copying machine 12 so that the copy mirror 88 stands by at the position shown by the chain line in FIG. 23. When the driving gear is activated, the wire is loosened by the action of the cam mechanism, so that the copy mirror 88 is moved to the position shown by the solid line in FIG. 23 by the action of the biasing means.

[Control Section]

As shown in FIGS. 1 and 2, a control keyboard 438 for controlling the recording and projecting apparatus is disposed on the recording and projecting apparatus body 10. On the control keyboard 438 are disposed, e.g., control buttons and display means for displaying numerals and an operative state of the system.

[Operation of the Embodiment]

The following is a description of the operation of the recording and projecting apparatus in accordance with this embodiment. The recording and projecting apparatus has various functions: namely, the camera function which enables the image of a document to be recorded on a microfilm accommodated in a cassette; the reader function which enables the image recorded on the microfilm in the cassette to be enlarged and projected on a screen; and the copy function which enables the image recorded on the microfilm to be enlarged and copied on a sheet of copying paper. These functions will successively explained below.

The operation of loading a cassette into the recording and projecting apparatus will first be explained.

When the power switch of the recording and projecting apparatus is turned on, the stopper mechanism (not shown) retaining the cassette holder 360 is canceled, so that the second arms 368, which are subjected to the biasing forces from the tension coil springs 365, are pivoted clockwise from the position shown in FIG. 22 about their respective portions at which they are pivotally connected to the cassette holder brackets 362 and 364, respectively, and the second arms 368 are thereby erected. In consequence, the other end portion of each of the second arm 368 is moved through the slot 382 provided in the cassette holder 360, and one end portion of each of the first arms 366 is moved through the slot 378 formed in the corresponding cassette holder bracket 362 or 364, thus causing the cassette holder 360 to be raised.

The cassette holder 360 causes the cover 372 to pivot against the biasing force from the torsion coil spring 393 while the rollers 370 are in rolling contact with the reverse side of the cover 372. In this way, the cassette holder 360 forces the cover 372 to open and springs out of the housing 10A of the recording and projecting apparatus body 10. During this movement of the cassette holder 360, the rotary damper 386 (shown in FIG. 15) acts so as to generate damping force. There is therefore no fear of any impact being generated when the cassette holder 360 is stopped in the position shown in FIG. 22A.

The cassette 14 is inserted into the cassette holder 360 in the direction of the arrow shown in FIG. 22A. After the cassette 14 has completely been inserted into the cassette holder 360, the cover 372 is pushed downward so as to be closed by a manual operation. As the cover 372 is moved downward, the second arms 368 are pivoted counterclockwise from the position shown in FIG. 22A against the biasing forces from the respective tension coil springs 365, and thereby flattened. In consequence, the first and second arms 366 and 368 are moved through the respective slots 378 and 382 in the reverse direction to the above, and the cassette holder 360 is thereby withdrawn into the housing 10A of the recording and projecting apparatus body 10, as shown in FIG. 22.

When the cover 372 is moved back to the position at which it closes the opening 10B provided in the housing 10A of the recording and projecting apparatus body 10, the cassette holder 360 is retained by the stopper mechanism (not shown). Accordingly, when the manual pushing operation is canceled, there is no fear of the cassette holder 360 springing out. Thus, the loading of the cassette 14 into the recording and projecting apparatus body 10 is completed.

In this state, the cassette 14 is accurately positioned at a predetermined position in the recording and projecting apparatus body 10 by virtue of the positioning pins 388 and 390 shown in FIG. 21. Further, when the cassette 14 is in this state, the cassette casing 16 is raised by the positioning pins 388 and 390 so that the reverse surface of the cassette casing 16 is separated from the bottom of the cassette holder 360 as shown in FIG. 15. As the cassette casing 16 is moved upward from the bottom of the cassette holder 360, the retainer members 374 are brought into pressure contact with the upper surface of the cassette casing 16. Thus, the cassette casing 16 is resiliently held from the upper side thereof.

In the course of the cassette holder 360 being pushed in as decribed above, the guard panel 18 of the cassette 14 is brought into contact with a member (not shown) and thereby pivoted to the position shown by the chain line in FIG. 4. Therefore, when the cassette 14 is in a loaded state, the tape 22 is exposed at the front side of the cassette casing 16. The tubular member 194 is positioned within the recess 20 in the cassette casing 16 as shown in FIG. 16, and the tape 22 is therefore positioned in a gap defined between the processing head 176 and the pressing plates 224, 226 and 228.

When the power supply of the recording and projecting apparatus is turned on, the solenoids 238 which are disposed so as to be respectively engaged with the arms 230 are energized, and the pressing plates 224, 226 and 228 are consequently separated from the front wall 176A of the processing head 176. There is therefore no fear of any of the pressing plates 224 preventing the tape 22 from smoothly entering the above-described gap.

At the same time, the brake release pin 392 (see FIG. 20) projecting upward from the cover 395 enters the through-hole 58 provided in the reverse surface of the cassette casing 16 to release the brake mechanism (not shown) which has locked the reels 32 from rotating. Therefore, when the cassette 14 is in a loaded state, the reels 32 are rotatable in both clockwise and counterclockwise directions. Further, in this state, the projecting walls 52 formed on the boss portion 46 of each reel 32 are engaged with the reel engaging projections 293 formed on the corresponding reel table 292 shown, for example, in FIG. 21.

The operation of positioning a microfilm will next be explained.

When an image is to be recorded on the microfilm 28, a frame concerned is positioned in front of the preheating chamber 204 of the processing head 176. When an image recorded on the microfilm 28 is to be projected or copied, a frame concerned is positioned in front of the exposing/projecting chamber 206. Data concerning each of the frames on the microfilm 28 has been recorded on the magnetic tape 26 spliced to the microfilm 28 through the recording and reproducing magnetic head 288, and it is therefore possible to read the data through the magnetic head 288.

To record or reproduce data, the solenoid 301 is energized so as to move the recording and reproducing magnetic head 288 in the direction of the arrow D shown in FIG. 21 against the biasing force from the compression coil spring 299, and the magnetic head 288 is thereby brought into close contact with the magnetic tape 26.

When a frame which is to be positioned at either the preheating chamber 204 or the exposing/projecting chamber 206 is determined, this frame is designated by actuating the buttons on the control keyboard 438. In consequence, the motor 298 (see FIG. 20) in the tape driving section shown in FIG. 21 is activated to rotate. The rotation of the motor 298 is transmitted to the first intermediate gear 304 through the gear 302 and further transmitted to the second and third intermediate gears 306 and 308.

When the right-hand reel table 292 (as viewed in FIG. 21) is selected to be a driving reel table and rotated counterclockwise, i.e., in the arrowed direction, the gear 302 is rotated clockwise, i.e., in the arrowed direction. In response to the rotation of the gear 302, the second intermediate gear 306 which is rotated counterclockwise together with the first intermediate gear 304 causes the third intermediate gear 308 to pivot counterclockwise about the pin 314. In response to the pivotal movement of the third intermediate gear 308, the oscillating plate 310 is also pivoted, and the third intermediate gear 308 is rotated clockwise. In this position, the third intermediate gear 308 is meshed with the gear 312 formed on the right-hand reel table 292 (as viewed in FIG. 21), and the reel table 292 is thereby rotated through the third intermediate gear 308.

When the left-hand reel table 292 (as viewed in FIG. 21) is selected to be a driving reel table and driven to rotate clockwise, the gear 302 is rotated in the counterclockwise direction which is reverse to the above, and the oscillating plate 310 is consequently pivoted in the reverse direction to the above, thus causing the third intermediate gear 308 to mesh with the gear 312 formed on the left-hand reel table 292.

When one of the reel tables 292 is rotated, one reel 32 which is engaged with this reel table 292 is rotated, and the tape 22 is wound up on this reel 32. The tape 22 is unwound from the other reel 32, and this reel 32 is rotated as a supply reel while being pulled by the tape 22. Since an appropriate braking force is applied to each of the reel table 292 by the associated band brake 320, an appropriate back tension acts on the pulled tape 22 through the driven-side reel table 292, so that there is no fear of the tape 22 sagging or being damaged.

It should be noted that the back tension is adjusted in such a manner that the motor 325 is driven to turn the cam plates 342 and 344 a predetermined angle through the pulley 327, the transmission belt 329, the pulley 323, the worm 321, the worm wheel 356 and the shaft 352, thus causing the band brakes 320 to apply an optimum braking force to the respective reel tables 292.

More specifically, as the cam plates 342 and 344 are turned, the abutment pieces 338 are displaced following the large-diameter portions 346, the intermediate-diameter portions 348 and the small-diameter portions 350. Consequently, the arms 334 are pivoted in accordance with the amounts of displacement of the respective abutment pieces 338, thereby controlling the tension of the tension coil springs 324. The angle of rotation of the cam plates 342 and 344 is automatically controlled on the basis of the tape speed, and the amount of the tape 22 remaining on the supply reel 32, etc. so that a substantially constant back tension is obtained.

Thus, the tape 22 is started to travel by rotating the reel tables 292, and when the microfilm 28 passes the processing head 176, the passage of blip marks 34 each formed for one frame is sensed by the blip sensor 262. More specifically, at the time when a blip mark 34 passes the sensor light source 264, the blip mark 34 intercepts the light from the light source 264, and no light is received by the blip sensor 262. In this way, it is possible to sense the passage of blip marks 34. In this embodiment, the number of sensed blip marks 34 is counted, and a designated frame is identified by an ordinal number counted from a starting frame When the designated frame is positioned at the preheating chamber 204 or the exposing/projecting chamber 206, the drive of the motor 298 is suspended, and the rotation of the reel tables 292 is thereby stopped.

The following is a description of the operation of recording the image of a document on a microfilm.

In this case, the document pressing plate 96 of the document table 64 shown, e.g., in FIG. 11 is first opened, and the document 66 (see FIG. 8) is placed on the upper side of the glass plate 92 in alignment with the positioning marks 112 (see FIG. 12) in such a manner that the side of the document 66 which is to be recorded faces downward. When the document pressing plate 96 is closed, the document 66 is fixed on the document table 64, and the reverse surface and/or the periphery of the document 66 is covered with the white pressing sheet 102.

When setting of the document 66 is completed, the camera mode is selected by actuating the buttons on the control keyboard 438. When the camera mode is selected, the motor 154 shown, e.g., in FIG. 11 is driven, and the take-up pulley 144 is thereby rotated through the worm 156, the worm wheel 152 and the shaft 146. As the take-up pulley 144 is rotated, the wire 140 is unwound from the pulley 144 in such a manner that the wire 140 is extended while the intermediate portion thereof is being guided by the pulley 142, thus causing the third mirror 70 to pivot clockwise from the position shown by the chain line in FIG. 11. The motor 154 is suspended when the mirror frame 136 comes in contact with the lower limit switch 158, and the third mirror 70 is stopped at the position shown by the solid line in FIG. 11.

When the pivotal movement of the third mirror 70 is stopped, the information that the preparation for recording has been completed is displayed on the control keyboard 438. When, in this state, the start button on the control keyboard 438 is pressed, the solenoid 238 engaged with the pressing plate 224 shown in FIGS. 17 and 18 is de-energized.

When the solenoid 238 is de-energized, the pressing plate 224 which is biased by the tension coil spring 236 is allowed to pivot clockwise from the position shown in FIG. 18, thus causing the microfilm 28 to be resiliently pressed against the front wall 176A of the processing head 176. At the same time, the heating element 242 is energized to generate heat, and the air pump 216 is activated to supply pressurized air to the preheating chamber 204. The pressurized air is passed through the minute bores 212 in the porous plate 210 and thereby dispersed uniformly to press the microfilm 28 against the pressing plate 224 with a uniform pressure. Thus, the frame positioned at the preheating chamber 204 is uniformly heated and thereby sensitized uniformly all over the surface thereof.

At the same time as the completion of heating, the solenoid 238 engaged with the arm 230 of the pressing plate 224 is energized, and the pressing plate 224 is consequently separated from the microfilm 28. Simultaneously, the energization of the heating element 242 and the drive of the air pump 216 are suspended. Thereafter, the motor 298 is activated to move the microfilm 28 by an amount corresponding to one frame, so that the heated frame is positioned in front of the exposing/projecting chamber 206. The movement of the microfilm 28 is controlled by sensing the passage of blip marks 34.

When the microfilm 28 is stopped, the solenoid 238 engaged with the arm 230 of the pressing plate 226 is deenergized. In consequence, the pressing plate 226 which is biased by the tension coil spring 236 is allowed to pivot clockwise from the position shown in FIG. 19, thus causing the microfilm 28 to be resiliently pressed against the front wall 176A of the processing head 176.

When the heightwise position of the microfilm 28 is misaligned, the respective slanted surfaces 246A and 246B of the projections 246 act so as to push down the upper edge of the microfilm 28 or push up the lower edge thereof as the pressing plate 226 is moved, thus enabling the microfilm 28 to be accurately positioned. When the pressing plate 226 is pressing the microfilm 28 against the processing head 176, the projections 246 are respectively fitted in the recesses 248, so that the microfilm 28 is accurately positioned with respect to the processing head 176.

It should be noted that the size of the heating element 242 is preferably set so as to be larger than the size of the opening defined by the through-hole 244 formed in the exposing/projecting chamber 206 in order to eliminate the fear of a part of an image missing even when the microfilm 28 is undesirably offset.

At the same time as the completion of the movement of the pressing plate 266, the illuminating lamps 114 in the document illuminating means 68 are turned on to illuminate the document 66. Since the direct rays from the illuminating lamp 114 and the reflected rays from the reflecting plates 116 are applied to the document 66 through the respective openings in the aperture masks 118, the document 66 is illuminated uniformly all over the surface thereof. Then, the shutter 180 is opened, and at the same time an automatic exposure controller (not shown) starts integration of the quantity of light reflected from the document 66. When the integrated value of the quantity of light reaches a predetermined value, the automatic exposure controller generates a signal to close the shutter 180. At the same time, the controller generates a signal to turn off the illuminating lamps 114.

While the shutter 180 is open, the light reflected from the document 66 in accordance with the pattern of the image thereon is incident on the third mirror 70, reflected by the second mirror 72 and the first mirror 74, and passed through the main lens 76 so as to be applied to the surface of the microfilm 28 by the optical system shown in FIG. 8. Thus, a latent image is formed on the photosensitive layer 38 of the microfilm 28 in accordance with the image pattern on the document 66.

Employment of the automatic exposure controller enables correction of factors in changes of the image density, such as variations in the ground density of the document 66 and variations in the voltage applied to the illuminating lamps 114, so that an optimal exposure operation is effected at all times.

After the shutter 180 has been closed, the solenoid 238 engaged with the arm 230 of the pressing plate 226 is energized by the operation of a controller (not shown), thus causing the pressing plate 226 to be separated from the microfilm 28.

Thereafter, the motor 298 is activated to move the microfilm 28 through a distance corresponding to one frame. Thus, the frame which has been exposed is moved and positioned in front of the developing chamber 208. The amount of movement of the microfilm 28 is controlled by sensing the passage of blip marks 34. When the movement of the microfilm 28 is suspended, the solenoid 238 engaged with the arm 230 of the pressing plate 228 is de-energized to allow the pressing plate 228 to resiliently press the microfilm 28 against the processing head 176 in a manner similar to the above. At the same time, the frame which is positioned at the developing chamber 208 is heated in a similar way to that performed at the preheating chamber 204. The latent image is developed by this heating so as to be visible, thus completing recording on the microfilm 8.

In this embodiment, after a developing operation, the pressing plate 228 is separated from the microfilm 28, and the microfilm 28 is fed by an amount corresponding to one frame in the same direction as the above. Consequently, the recorded frame is positioned in front of the optical sensor 250, and it is therefore possible to check whether or not recording on this frame has been completed and whether or not developing conditions (heating temperature, heating time, etc.) are appropriate.

Figure 25:
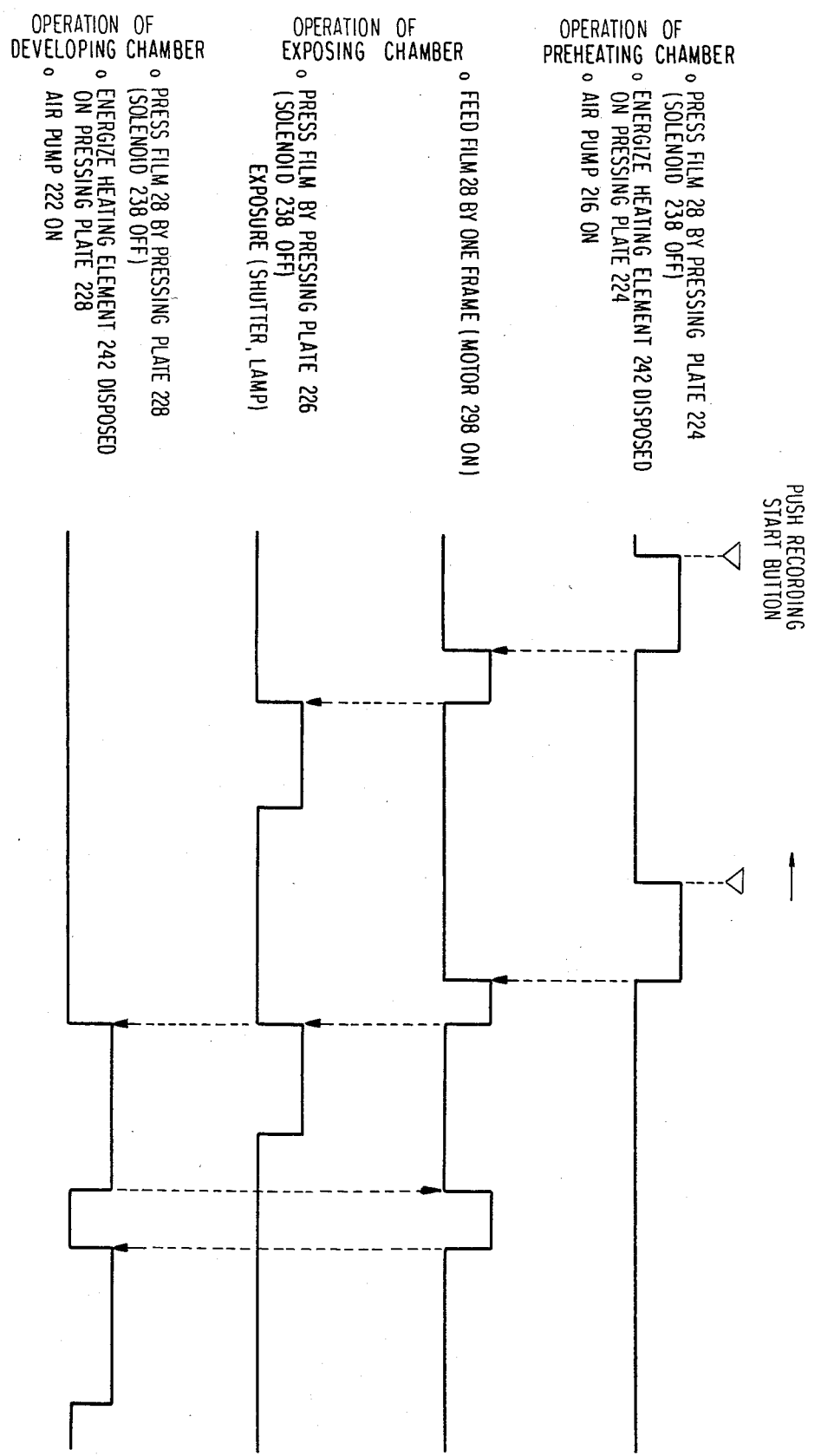
FIG. 25 shows a sequence of an operation of the embodiment of the recording and projecting apparatus according to the present invention in the camera mode.

Although each process has been described about only one frame of the microfilm 28, it is also possible to continuously effect recording on consecutive frames. In such case, these frames are simultaneously subjected to different kinds of processing, respectively, since the processing chambers are disposed at a pitch which is equal to the frame pitch. FIG. 25 exemplarily shows a sequence of a continuous recording operation in which two frames which are adjacent to each other are continuously subjected to recording.

The following is a description of the operation of projecting an image recorded on a microfilm by means of the optical system shown in FIG. 9.

In this case, a frame on the microfilm 28 which is to be projected is positioned in front of the exposing/projecting chamber 206 of the processing head 176. In the apparatus in accordance with this embodiment, the reader mode has automatically been selected when no button on the control keyboard 438 is actuated. In the reader mode, the third mirror 70 stands by in the position shown by the chain line in FIG. 11 in which the mirror 136 is in contact with the upper limit switch 160.

When the start button on the control keyboard 438 is pressed, the solenoid 238 engaged with the arm 230 of the pressing plate 226 is de-energized to allow the pressing plate 226 to press the microfilm 28 against the front wall 176A of the processing head 176. Further, the shutter 180 is opened, and the halogen lamp 184 in the projecting light source section 78 is turned on. In addition, the cooling fan 200 is activated. The light from the halogen lamp 184, together with the light reflected by the reflecting plates 186, is condensed by the condenser lens 188, reflected by the lower projecting mirror 190 so as to travel upward, condensed again by the condenser lens 196 and then reflected by the upper projecting mirror 198 so as to reach the rear surface of the microfilm 28 through the through-hole 244 provided in the pressing plate 226.

It should be noted that the lower projecting mirror 190 is defined by a cold mirror which transmits heat rays, and therefore the light reaching the microfilm 28 has a relatively low temperature.

At the same time as the halogen lamp 184 is turned on, the air pump 220 is activated to supply cold air to the exposing/projecting chamber 206 in order to prevent the microfilm 28 from being heated excessively.

The light having reached the microfilm 28 is transmitted thereby, and the image recorded on the microfilm 28 is formed on the first mirror 74 by the main lens 76. The optical image formed on the first mirror 74 is reflected thereby so as to reach the second mirror 72, and the image is further reflected by the mirror 72, transmitted by the screen 80 and projected thereon.

In the reader mode, it is possible to continuously view projected images of the microfilm 28 within a short period of time by successively advancing the microfilm 28 for each frame through the control keyboard 438. In such case, every time the microfilm 28 is moved, the shutter 180 is closed in order to prevent flickering due to persistence phenomenon.

The operation of copying an image recorded on a microfilm by the optical system shown in FIG. 10 will be explained below.

When the copy button on the control keyboard 438 is pressed while an image is being projected on the screen 80, the driving gear in the copying machine 12 is activated, and the copy mirror 88 is started to pivot counterclockwise as viewed in FIG. 11 about the pin 164 by the action of the above-described mechanism. In addition, the conversion lens 82 for slightly reducing the size of the image on the screen 80 is moved to a position between the main lens 76 and the first mirror 74 as shown in FIG. 14. At the same time, the feed rollers 406 and the like of the copying machine shown in FIG. 23 are activated by the driving force from the driving gear.

At the same time, the charging device 398 is started to be energized, and corona discharge is generated by the corona wires 408. The copying paper 86 in the shape of a roll is unwound by the action of the feed rollers 406 and transported to the exposing table 84. In the course of this transporation, the copying paper 86 is charged directly below the charging device 398. When the copying paper 86 has been advanced forward a predetermined length, a clutch (not shown) is disengaged to suspend the rotation of the feed rollers 406. At the same time, the leading end portion of the paper 86 is cut in the shape of a sheet by the cutter 396.

Then, the sheet of copying paper 86 which has been charged all over the surface thereof is transported by the endless belts 418 of the exposing table 84 in which the driving shaft 410 is being rotated. When the leading end of the copying paper 86 reaches a predetermined position on the exposing table 84, this is detected by a limit switch (not shown) which is disposed on the exposing table 84, and the drive of the driving gear in the copying machine 12 is suspended. Thus, the copy mirror 88 is stopped in the position shown by the chain line in FIG. 11 (the position shown by the solid line in FIG. 23).

At the same time as the copying paper 86 is stopped on the exposing table 84, the shutter 180 is opened for a predetermined period of time by the action of the automatic exposure controller (not shown), and an image recorded on the microfilm 28 is formed on the first mirror 74 by the main lens 76 and the conversion lens 82. The size of the optical image formed on the first mirror 74 is made slightly smaller than that in the case of the reader mode by the action of the conversion lens 82. The optical image is reflected by the first mirror 74 so as to reach the second mirror 72, and the optical image reflected by the mirror 72 is further reflected by the copy mirror 88 so as to be applied to the copying paper 86 on the exposing table 84. The exposed copying paper 86 has an electrostatic latent image formed thereon.

When the shutter 180 is closed, the driving gear of the copying machine 12 is activated again to rotate the driving shaft 410 of the exposing table 84, so that the exposed copying paper 86 is sent to the developing device 402. In the developing device 402, the paper 86 is advanced into the gap between the toner roller 424 and the feed roller 426 by the action of the feed rollers 420, and the toner attached to the peripheral surface of the toner roller 424 adheres to the exposed surface of the paper 86 to develop the electrostatic latent image.

The developed copying paper 86 is further advanced to the fixing device 404 where it is pressed by the pressure rollers 428 to fix the toner. The copying paper 86 passed through the fixing device 404 reaches the delivery passage 430 where it drops gravitationally, and slides on the slope 432 to reach the paper stacker 434.

Thus, in this embodiment, the blip marks 34 are printed on the microfilm 28 in advance so that the blip marks 34 respectively correspond to a plurality of frames on the microfilm 28, and the blip sensor 262 for detecting the blip marks 34 is disposed in the recording and projecting apparatus. It is therefore possible to dispose a specific frame on the microfilm 28 at a predetermined position in the processing head 176 without the problem that, as the length of the microfilm is increased, positional errors may be cumulated to result in a disadvantageously large error.

In addition, since it is possible to effect a frame positioning operation in the described way and to record data on the magnetic tape 26 which data represents the fact that a particular frame has already been subjected to recording, the recording and projecting apparatus can readily be combined with a control means which is arranged such that, when the operator erroneously designates a frame for recording which has already been subjected to recording, the control means detects this fact and sounds an alarm or the like.

It should be noted that the magnetic tape 26 may be replaced with an IC memory, a magnetic-bubble memory or other similar means.

Figure 26:
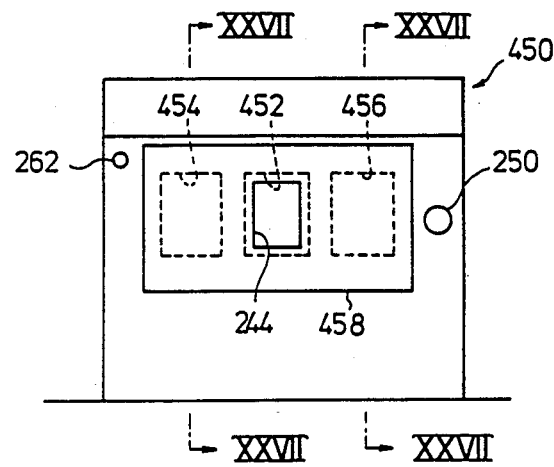
FIG. 26 shows a processing head in accordance with another embodiment of the present invention.
Figure 27:
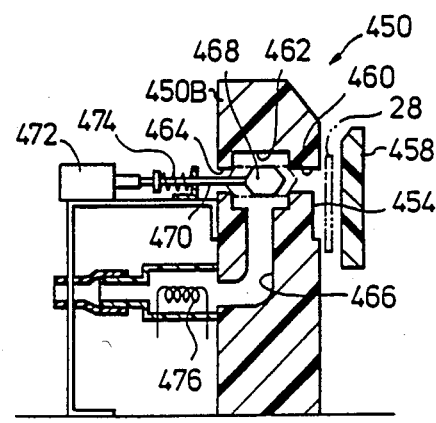
FIG. 27 is a sectional view taken along the line XXVII—XXVII in FIG. 26.

FIGS. 26 and 27 show in combination a processing head in accordance with another embodiment of the present invention.

In a processing head 450 in accordance with this embodiment, the structure of an exposing/projecting chamber 452 is basically the same as that in the above-described embodiment. However, the structures of preheating and developing chambers 454 and 456 (the structures of these chambers 454 and 456 are basically the same as each other) and the sturucture of a pressing plate 458 are different from those in the above-described embodiment.

Although the pressing plates 224, 226 and 228 in the above-described embodiment are separated from each other so as to face their respective chambers, the pressing plate 458 in this embodiment is formed so as to have a size which allows it to cover all the openings of the exposing/projecting chamber 452, the preheating chamber 454 and the developing chamber 456, so that the pressing plate 458 can be activated by a single pressing plate driving mechanism. No heating element such as the heating element 242 in the above-described embodiment is disposed on the pressing plate 458.

The preheating chamber 454 is communicated with a hot air inlet passage 460 as shown in FIG. 27. The passage 460 is communicated with a branch chamber 462 which, in turn, is communicated with a hot air discharge passage 464 which extends through the rear wall 450B of the processing head 450 and also with a hot air supply passage 466.

The hot air discharge passage 464 is disposed so as to extend on the same straight line as the hot air inlet passage 460. A valve 468 is disposed in the branch chamber 462, and connected to a push-type solenoid 472 through a shaft 470. When the solenoid 472 is de-energized, the valve 468, which is biased by a compression coil spring 474, is moved leftward as viewed in FIG. 27 so as to close the hot air discharge passage 464. When the solenoid 472 is energized, the valve 468 is moved rightward against the biasing force from the spring 474 so as to close the hot air inlet passage 460.

The cross-sectional configurations and dimensions of the hot air inlet and discharge passages 460 and 464 are set so that, when the position of the valve 468 is changed, there is no difference between the flow rate of hot air flowing into either one of these passages 460 and 464 before the valve changeover operation and the flow rate of hot air flowing into the other of the two passages after the valve changeover operation. The hot air supply passage 466 is connected to an air pump (not shown) through a heater 476. The structure of the developing chamber 456 is basically the same as that of the preheating chamber 454.

The following is a description of the operation of the processing head 450 in accordance with this embodiment arranged as described above.

When the camera mode is selected, the air pump (not shown) is activated, and air heated by the heated 476 is thereby supplied to the branch chamber 462 through the hot air supply passage 466. When it is not necessary to heat the microfilm 28 in either the preheating chamber 454 or the developing chamber 456, the solenoid 472 is in an energized state, and therefore the hot air inlet passage 460 is closed. Accordingly, the hot air supplied to the branch chamber 462 is discharged through the hot air discharge passage 464.

When the microfilm 28 needs to be heated, the solenoid 472 is de-energized, and the valve 468 which is biased by the compression coil spring 474 is consequently moved to close the hot air discharge passage 464. Thus, the hot air supplied to the branch chamber 462 is led to either the preheating chamber 454 or the developing chamber 456 through the hot air inlet passage 460 to heat the microfilm 28. After a predetermined period of time has passed, the solenoid 472 is energized again to change over the position of the valve 472, thus suspending the heating operation.

As described above, in this embodiment, hot air is immediately introduced into either the preheating chamber 454 or the developing chamber 456 in response to the changeover of the position of the valve 468, and the valve 468 is positioned in the vicinity of these chambers 454 and 456. Therefore, it is possible to quicken the rise in temperature of the microfilm 28. In addition, there is no fear of the microfilm 28 being heated when it need not be heated, which would otherwise result in undesirable sensitization of a frame.

Further, when the position of the valve 472 is changed, there is no difference between the flow rate of hot air flowing into either one of the hot air inlet and discharge passages 460 and 464 before the valve changeover operation and the flow rate of hot air flowing into the other of the two passages after the valve changeover operation. Accordingly, no change occurs in the temperature of hot air flowing into these passages 460 and 464, and this facilitates the temperature control of the hot air.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A recording and projecting apparatus employing a film using a photosensitive material which is sensitized by heating and developed after exposure by reheating, said apparatus comprising:
    (a) marks to be detected which are provided on said film, said marks corresponding to the respective positions of images formed on said film;
    (b) detecting means for detecting said marks; and
    (c) driving means for disposing a desired image frame on said film at a predetermined position on the basis of the detection effected by said detecting means, whereby a necessary image frame is allowed to face a processing position accurately;
    a processing head provided with a reheating section for heating said film prior to exposure, an exposing section for exposing said film, and a developing section for heating said film after exposure.

2. A recording and projecting apparatus according to claim 1, wherein said processing head has a pressing plate for pressing said film against said processing head, said pressing plate having a light-transmitting window facing said exposing section, said window being adapted to correspond to one image on said film.

3. A recording and projecting apparatus according to claim 1, wherein said processing head has an inlet flow passage for introducing hot air for heating said film into either said preheating or developing section, a discharge flow passage for discharging the film-heating hot air to the outside of said processing head, and a switching valve for switching over said two passages one from the other.

4. A recording and projecting apparatus according to claim 1, wherein said inlet and discharge flow passages are arranged so that, when the position of said switching valve is changed, there is no difference between the flow rate of film-heating hot air flowing through either one of said two passages before the position of said switching valve is changed and the flow rate of film-heating hot air flowing through the other of said two passages after the position of said valve has been changed.

5. A recording and projecting apparatus according to claim 1, wherein said marks to be detected are defined by light-shielding means which are disposed along one lateral edge of said film.

6. A recording and projecting apparatus according to claim 5, wherein said detecting means has a light-projecting section disposed on one side of said film, and a light-receiving section for detecting the light transmitted by said film.

7. A recording and projecting apparatus according to claim 1, wherein said markes to be detected are printed on said film.

8. A recording and projecting apparatus according to claim 1, wherein said film has a magnetic tape spliced thereto for recording data concerning the position of each image frame, the contents of each frame, etc.

9. A recording and projecting apparatus according to claim 1, wherein said detecting means detects said marks to be detected and counts the number of detected marks, said driving means moving said film and disposing a designated image at a predetermined position on the basis of said count.

10. A recording and projecting apparatus employing a film using a photosensitive material which is sensitized by heating and developed after exposure by reheating, said apparatus comprising:
(a) a preheating section for heating said film prior to exposure;
(b) an exposing section for exposing said film;
(c) a developing section for heating said film after exposure;
(d) marks to be detected which are provided on said film at predetermined regular spacings;
(e) driving means for successively disposing a predetermined one of the image frames on said film which respectively correspond to said marks at said preheating, exposing and developing sections, whereby even when said film is relatively long, cumulation fo detection errors is prevented, and accurate positioning is thereby effected;
wherein said preheating, exposing and developing sections are provided on a processing head; and
wherein said preheating, exposing and developing sections are respectively provided with pressing plates which are individually activated to press said film.

11. A recording and projecting apparatus according to claim 10, wherein said marks are detected by detecting means.

12. A recording and projecting apparatus according to claim 10, wherein said processing head has a pressing plate for pressing said film against said processing head, said pressing plate having a light-transmitting window facing said exposing section, said window being adapted to correspond to one image on said film.

13. A recording and projecting apparatus according to claim 12, wherein said pressing plate has either projections or recesses, while said exposing section in said processing head has either recesses or projections which are engageable with said projections or recesses formed on said pressing plate, so that positioning of said film is effected through these projections and recesses.

14. A recording and projecting apparatus according to claim 10, wherein said processing head has an inlet flow passage for introducing hot air for heating said film into either said preheating or developing section, a discharge flow passage for discharging the film-heating hot air to the outside of said processing head, and a switching valve for switching over said two passages one from the other.

15. A recording and projecting apparatus according to claim 10, wherein said preheating section is supplied with air from an air pump through a porous plate.

16. A recording and projecting apparatus employing a film using a photosensitive material which is sensitized by heating and developed after exposure by reheating, said apparatus comprising:
(a) marks to be detected which are provided on said film, said marks corresponding to the respective positions of images formed on said film;
(b) detecting means for detecting said marks; and
(c) driving means for disposing a desired image frame on said film at a predetermined position on the basis of the detection effected by said detecting means, whereby a necessary image frame is allowed to face a processing position accurately;
an optical sensor for detecting whether or not an image has already been recorded on said film and whether or not developing conditions such as heating temperature are appropriate.

17. A recording and projecting apparatus employing a film using a photosensitive material which is sensitized by heating and developed after exposure by reheating, said apparatus comprising:
(a) a preheating section for heating said film prior to exposure;
(b) an exposing section for exposing said film;
(c) a developing section for heating said film after exposure;
(d) marks to be detected which are provided on said film at predetermined regular spacings;
(e) driving means for successively disposing a predetermined one of the image frames on said film which respectively corresponds to said marks at said preheating, exposing and developing sections, whereby, even when said film is relatively long, cumulation of detection errors is prevented, and accurate positioning is thereby effected; and
wherein said preheating, exposing and developing sections are respectively provided with pressing plates which are individually activated to press said film.

18. A recording and projecting apparatus employing a film using a photosensitive material which is sensitized by heating and developed after exposure by reheating, said apparatus comprising:
(a) a cassette accommodating said film in such a manner that said film is wound up on a pair of reels with both its longitudinal ends respectively retained by these reels;
(b) a magnetic tape for recording data interposed between one end of said film and the corresponding reel;
(c) marks to be detected formed on said film at predetermined regular spacings;
(d) a processing head for processing said film, said processing head having a preheating chamber for heating said film prior to exposure, an exposing chamber for exposing said film, and a developing chamber for heating said film after exposure;
(e) detecting means for detecting said marks; and
(f) driving means adapted for identifying a particular image position on said film on the basis of detection of said marks and disposing said image at a predetermined position.

* * * * *